(12) United States Patent
Hannuksela et al.

(10) Patent No.: US 12,034,973 B2
(45) Date of Patent: Jul. 9, 2024

(54) APPARATUS AND A METHOD FOR PERFORMING A FILE ENCAPSULATION AND DECAPSULATION PROCESS FOR A CODED VIDEO BITSTREAM

(71) Applicant: Nokia Technologies Oy, Espoo (FI)

(72) Inventors: Miska Hannuksela, Tampere (FI); Emre Aksu, Tampere (FI); Kashyap Kammachi Sreedhar, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/972,318

(22) PCT Filed: Jul. 4, 2019

(86) PCT No.: PCT/FI2019/050524
§ 371 (c)(1),
(2) Date: Dec. 4, 2020

(87) PCT Pub. No.: WO2020/008115
PCT Pub. Date: Jan. 9, 2020

(65) Prior Publication Data
US 2021/0250617 A1 Aug. 12, 2021

(30) Foreign Application Priority Data
Jul. 6, 2018 (FI) ..................... 20185630

(51) Int. Cl.
*H04N 19/70* (2014.01)
*H04N 19/30* (2014.01)
(Continued)

(52) U.S. Cl.
CPC ......... *H04N 19/70* (2014.11); *H04N 21/2358* (2013.01); *H04N 21/8456* (2013.01); *H04N 19/30* (2014.11)

(58) Field of Classification Search
CPC ............... H04N 19/70; H04N 21/2358; H04N 21/8456; H04N 19/30; H04N 19/46;
(Continued)

(56) References Cited

U.S. PATENT DOCUMENTS

2010/0061448 A1 3/2010 Zhou et al.
2012/0221741 A1* 8/2012 Frojdh ................... G11B 20/14
348/E7.024
(Continued)

FOREIGN PATENT DOCUMENTS

WO 2015/101716 A1 7/2015
WO 2017/140939 A1 8/2017
(Continued)

OTHER PUBLICATIONS

Singer et al. "Technologies under Consideration for ISOBMFF", ISO/IEC/JTC1/SC29/WG11 MPEG2017/N16935 Torino, Italy, Jul. 2017. Document identified and provided in IDS dated Mar. 3, 2022. (Year: 2017).*

(Continued)

*Primary Examiner* — Richard A Hansell, Jr.
(74) *Attorney, Agent, or Firm* — Harrington & Smith

(57) ABSTRACT

Described embodiments include methods and techniques for creating media container files. An exemplary method comprises steps wherein, instead of estimating the size of a media segment header based on the segment duration, identified media data boxes are used. In the method, an identified media data element is written in a container file. Included into the identified data element, an identifier is used as a reference for the identified media data of the segment by other elements. The identifier can be a first movie fragment sequence number, or a first track fragment decode time.

14 Claims, 8 Drawing Sheets

(51) Int. Cl.
  *H04N 21/235* (2011.01)
  *H04N 21/845* (2011.01)
(58) Field of Classification Search
  CPC ......... H04N 21/8455; H04N 21/85406; H04N 21/8547; G06F 16/71
  See application file for complete search history.

(56) References Cited

U.S. PATENT DOCUMENTS

| | | | |
|---|---|---|---|
| 2012/0233345 A1* | 9/2012 | Hannuksela | H04N 21/8456 709/231 |
| 2013/0132507 A1 | 5/2013 | Swaminathan et al. | |
| 2015/0195327 A1 | 7/2015 | Bouazizi et al. | |
| 2016/0182927 A1 | 6/2016 | Denoual et al. | |
| 2016/0232233 A1 | 8/2016 | Hendry et al. | |
| 2016/0285941 A1* | 9/2016 | Xie | H04N 21/64792 |
| 2017/0013303 A1 | 1/2017 | Kitazato et al. | |
| 2017/0347163 A1* | 11/2017 | Wang | G06T 9/00 |
| 2020/0404395 A1* | 12/2020 | Park | G06F 16/784 |
| 2021/0176509 A1* | 6/2021 | Maze | H04N 13/243 |

FOREIGN PATENT DOCUMENTS

| | | | |
|---|---|---|---|
| WO | WO-2017/140946 A1 | 8/2017 | |
| WO | WO-2017140939 A1 * | 8/2017 | ........... H04L 65/602 |

OTHER PUBLICATIONS

"Information Technology—Coding of Audio-Visual Objects—Part 12: ISO Base Media File Format", ISO/IEC 14496-12, Fifth edition, Dec. 15, 2015, 248 pages.
"Information Technology—Coding of Audio-Visual Objects—Part 14: MP4 File Format", ISO/IEC 14496-14, First edition, Nov. 15, 2003, 18 pages.
"Information Technology—Coding of Audio-Visual Objects—Part 15: Advanced Video Coding (AVC) File Format", ISO/IEC 14496-15, First edition, Apr. 15, 2004, 29 pages.
"3rd Generation Partnership Project; Technical Specification Group Services and System Aspects; Transparent end-to-end packet switched streaming service (PSS); 3GPP file format (3GP) (Release 14)", 3GPP TS 26.244, V14.1.0, Dec. 2017, pp. 1-67.
Fielding et al., "Hypertext Transfer Protocol (HTTP/1.1): Message Syntax and Routing", RFC 7230, Internet Engineering Task Force (IETF), Jun. 2014, pp. 1-89.
Swaminathan et al., "Low Latency Live Video Streaming using HTTP Chunked Encoding", IEEE 13th International Workshop on Multimedia Signal Processing, Oct. 17-19, 2011, 6 pages.
Brandenburg et al., "Proposal for Reducing Overhead of Trun Box", ISO/IEC JTC1/SC29/WG11 MPEG2018 m42441/, Tiledmedia, Apr. 2018, 3 pages.
"Information technology—Coding of audio-visual objects—Part 12: ISO base media file format, Amendment 1", ISO/IEC JTC1 /SC 29 /WG 11 /N17378, ISO, 2014, pp. 1-22.
"Information technology—Coding of audio-visual objects—Part 12: ISO base media file format, Amendment 2", ISO/IEC jTC 1/SC 29/WG 11 / N17592, ISO/IEC 14496-12 6th edition Amd. 2, 2017, pp. 1-4.
"Information Technology—Generic Coding of Moving Pictures and Associated Audio Information: Systems", ISO/IEC 13818-1, Third Edition, Oct. 15, 2007, 188 pages.
"Video Coding for Low Bit Rate Communication", Series H: Audiovisual And Multimedia Systems, Infrastructure of audiovisual services—Coding of moving Video, ITU-T Recommendation H.263, Jan. 2005, 226 pages.
"Advanced Video Coding for Generic Audiovisual services", Series H: Audiovisual and Multimedia Systems, Infrastructure of audio-visual services—Coding of moving Video, Recommendation ITU-T H.264, Apr. 2017, 812 pages.
"High Efficiency Video Coding", Series H: Audiovisual and Multimedia Systems, Infrastructure of audiovisual services—Coding of moving video, Recommendation ITU-T H.265, Feb. 2018, 692 pages.
"3rd Generation Partnership Project; Technical Specification Group Services and System Aspects; Transparent end-to-end Packet-switched Streaming Service (PSS); Protocols and codecs (Release 15)", 3GPP TS 26.234, V15.0.0, Dec. 2017, pp. 1-173.
"Information Technology—Dynamic Adaptive Streaming over HTTP (DASH)—Part 1: Media Presentation Description and Segment Formats", ISO/IEC 23009-1, Second Edition, May 15, 2014, 152 pages.
"3rd Generation Partnership Project; Technical Specification Group Services and System Aspects; Transparent end-to-end Packet-switched Streaming Service (PSS); Progressive Download and Dynamic Adaptive Streaming over http (3GP Dash) (Release 15)", 3GPP TS 26.247, V15.3.0, Jun. 2018, pp. 1-132.
Pantos et al., "HTTP Live Streaming", RFC 8216, Independent Submission, Aug. 2017, pp. 1-60.
Bross et al., "Versatile Video Coding Editorial Refinements on Draft 10", Joint Video Experts Team (JVET) of ITU-T SG 16 WP 3 and ISO/IEC JTC 1/SC 29, JVET-T2001-v1, Oct. 7-16, 2020, pp. 1-511.
Office action received for corresponding Finnish Patent Application No. 20185630, dated Mar. 21, 2019, 10 pages.
International Search Report and Written Opinion received for corresponding Patent Cooperation Treaty Application No. PCT/FI2019/050524, dated Nov. 20, 2019, 16 pages.
"Technologies Under Consideration for ISOBMFF", 119. MPEG Meeting; Jul. 17-Jul. 21, 2017; Torino; (Motion Picture Expert Group or ISO/IEC JTC1/SC29/WG11), No. n16935 Aug. 3, 2017 (Aug. 3, 2017), XP030023598, Retrieved from the internet: URL: http://phenix.int-evry.fr/mpeg/doc_end_user/documents/119_Torino/wg11/w16935.zipw16935_FileFormat_14496-12_TuC.doc [retrieved on Aug. 3, 2017].
David Singer, Miska M. Hannuksela, Frederic Maze "Technologies Under Consideration for ISOBFF" ISO/IECJTC1/SC29/WG11 MPEG 2017/N16935. Jul. 2017.
"Information Technology—Coding of Audio-Visual Object—Part 12: ISO Base Media File Format, Amendment 2" ISO/IEC 14496-12 6$^{th}$ Edition Amd. 2. [retrieved Nov. 13, 2023].

* cited by examiner

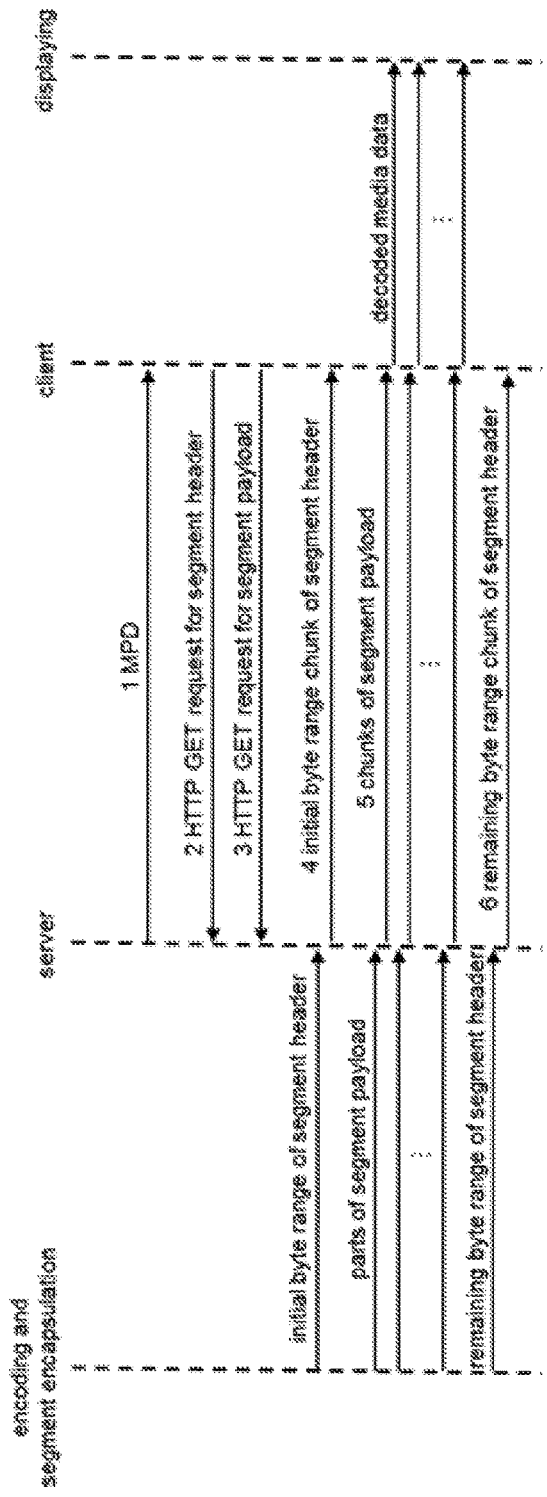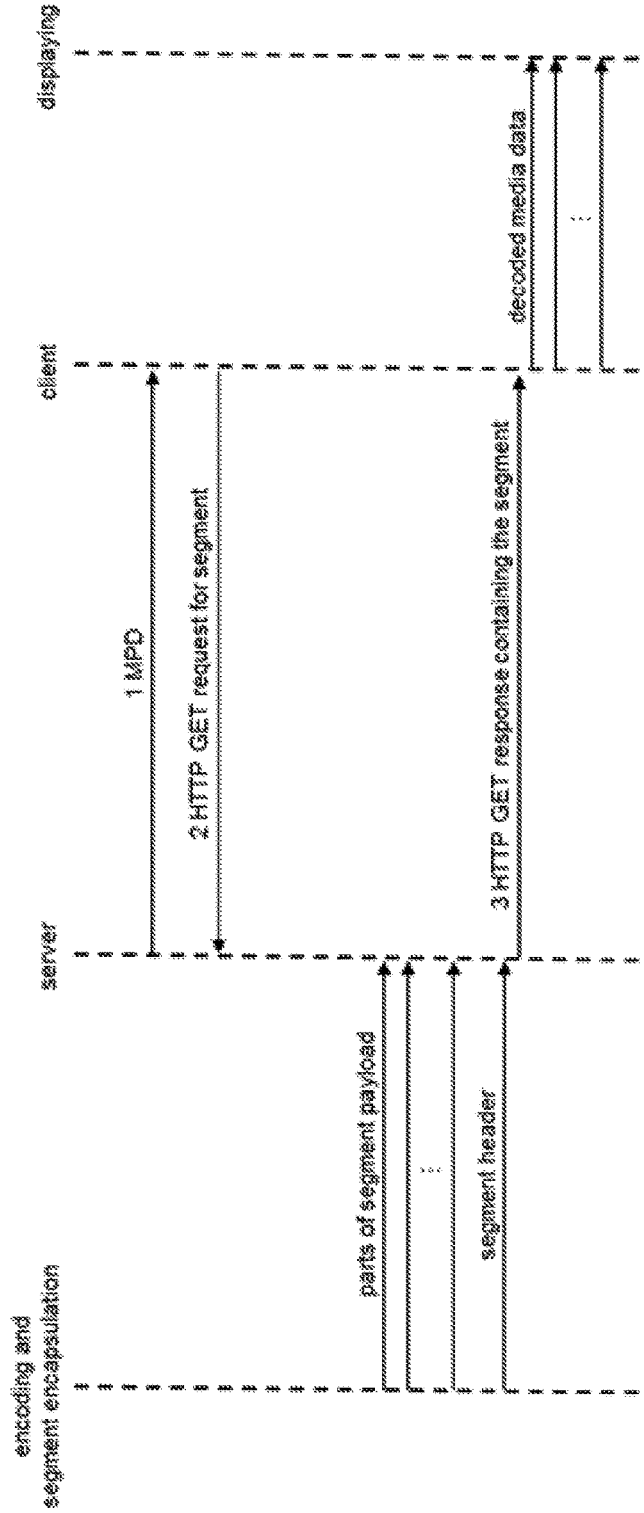

APPARATUS AND A METHOD FOR PERFORMING A FILE ENCAPSULATION AND DECAPSULATION PROCESS FOR A CODED VIDEO BITSTREAM

RELATED APPLICATION

This application claims priority to PCT Application No. PCT/FI2019/050524, filed on Jul. 4, 2019, which claims priority to Finnish Application No. 20185630, filed on Jul. 6, 2018, each of which is incorporated herein by reference in its entirety.

TECHNICAL FIELD

The present invention relates to an apparatus, a method and a computer program for video coding and decoding.

BACKGROUND

A media container file format is an element in the chain of media content production, manipulation, transmission and consumption. In this context, the coding format (i.e., the elementary stream format) relates to the action of a specific coding algorithm that codes the content information into a bitstream. The container file format comprises mechanisms for organizing the generated bitstream in such a way that it can be accessed for local decoding and playback, transferring as a file, or streaming, all utilizing a variety of storage and transport architectures. The container file format can also facilitate the interchanging and editing of the media, as well as the recording of received real-time streams to a file.

In a container file according to ISO base media file format (ISOBMFF; ISO/IEC 14496-12), the media data and metadata is arranged in various types of boxes. ISOBMFF provides a movie fragment feature that may enable splitting the metadata that otherwise might reside in a movie box into multiple pieces. Consequently, the size of the movie box may be limited in order to avoid losing data if any unwanted incident occurs.

In container files, it is also possible to use extractors, which may be defined as structures that are stored in samples and extract coded video data from other tracks by reference when processing the track in a player. Extractors enable compact formation of tracks that extract coded video data by reference.

However, upon using the movie fragment feature or extractors, the overhead of the metadata or extractor tracks may become significant compared to the payload.

SUMMARY

Now in order to at least alleviate the above problems, an enhanced encoding method is introduced herein.

A method according to a first aspect comprises writing in a container file at least one pattern indicative of per-sample metadata for each sample in the pattern; and indicating, in segment metadata, which pattern of the at least one pattern is in use for respective media data by associating samples of the respective media data cyclically with the per-sample metadata of the pattern.

An apparatus according to a second aspect comprises means for writing in a container file at least one pattern indicative of per-sample metadata for each sample in the pattern; and means for indicating, in segment metadata, which pattern of the at least one pattern is in use for respective media data by associating samples of the respective media data cyclically with the per-sample metadata of the pattern.

According to an embodiment, the container file is structured according to ISOBMFF, the apparatus further comprises means for writing in the container file the at least one pattern comprising both TrackRunBox metadata and the bit/nibble/byte count of sample size; and means for including in a TrackRunBox per-sample signalling of sample size.

According to an embodiment, the apparatus further comprises means for writing in the container file the at least one pattern comprising at least one pattern of default extractors; means for cyclically assigning samples of an extractor track to the at least one pattern; and means for assigning the default extractors in a pattern of the at least one pattern to extractors of a sample of the extractor track.

According to an embodiment, the apparatus further comprises means for indicating more than one alternative for a default extractor.

According to an embodiment, the apparatus further comprises means for indicating an alternative among the more than one alternative that is to be used if referenced tracks in other alternatives among the more than one alternative are not available.

According to an embodiment, the apparatus further comprises means for indicating that a sample offset for a track fragment run is kept unchanged.

According to an embodiment, the apparatus further comprises means for compiling a streaming manifest indicating separate URLs for a segment header and a corresponding segment payload.

According to an embodiment, the streaming manifest further indicates that the data in the segment payload is tightly packed and in decoding order.

A method and a related apparatus comprising means for carrying the method according to further aspects comprise parsing from a container file at least one pattern indicative of per-sample metadata for each sample in the pattern; parsing, from segment metadata, which pattern of the at least one pattern is in use for respective media data; and associating samples of the respective media data cyclically with the per-sample metadata of the pattern.

A method and a related apparatus comprising means for carrying the method according to further aspects comprise receiving, in a bitstream, at least one pattern indicative of per-sample metadata for each sample in the pattern; receiving a byte range of media data and an initial part of segment metadata, the initial part indicating which pattern of the at least one pattern is in use for respective media data by associating samples of the respective media data cyclically with the per-sample metadata of the pattern; receiving a set of one or more indications indicating that the byte range consists of length-prefixed media data units that are contiguous and appear in decoding order; concluding, from the length prefixes, the boundaries of media data units within the byte range; using access unit boundary detection to conclude mapping of media data units to access units; and associating concluded access units cyclically with the per-sample metadata of the pattern.

The further aspects relate to apparatuses and computer readable storage media stored with code thereon, which are arranged to carry out the above methods and one or more of the embodiments related thereto.

BRIEF DESCRIPTION OF THE DRAWINGS

For better understanding of the present invention, reference will now be made by way of example to the accompanying drawings in which:

FIGS. 9a and 9b show examples of a protocol sequence diagram according to an embodiment of the invention and according to prior art, correspondingly;

DETAILED DESCRIPTION OF SOME EXAMPLE EMBODIMENTS

Figure 1:
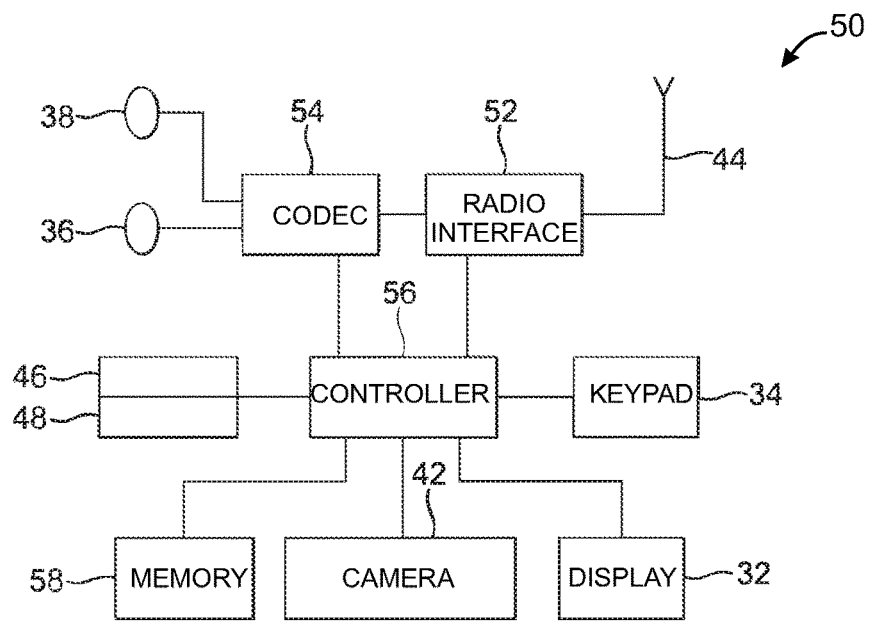
FIG. 1 shows schematically an electronic device employing embodiments of the invention.
Figure 2:
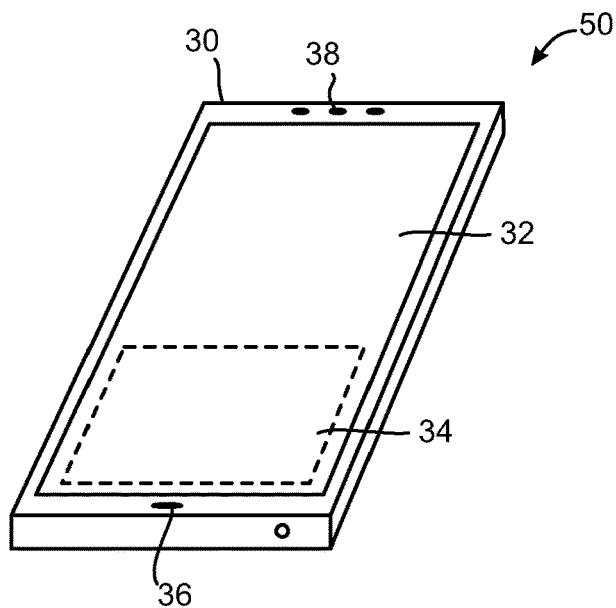
FIG. 2 shows schematically a user equipment suitable for employing embodiments of the invention.

The following describes in further detail suitable apparatus and possible mechanisms for implementing the embodiments described below. In this regard reference is first made to FIGS. 1 and 2, where FIG. 1 shows a block diagram of a video coding system according to an example embodiment as a schematic block diagram of an exemplary apparatus or electronic device 50, which may incorporate a codec according to an embodiment of the invention. FIG. 2 shows a layout of an apparatus according to an example embodiment. The elements of FIGS. 1 and 2 will be explained next.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery (or in other embodiments of the invention the device may be powered by any suitable mobile energy device such as solar cell, fuel cell or clockwork generator). The apparatus may further comprise a camera capable of recording or capturing images and/or video. The apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56, processor or processor circuitry for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

The apparatus 50 may comprise a camera capable of recording or detecting individual frames which are then passed to the codec 54 or the controller for processing. The apparatus may receive the video image data for processing from another device prior to transmission and/or storage. The apparatus 50 may also receive either wirelessly or by a wired connection the image for coding/decoding. The structural elements of apparatus 50 described above represent examples of means for performing a corresponding function.

Figure 3:
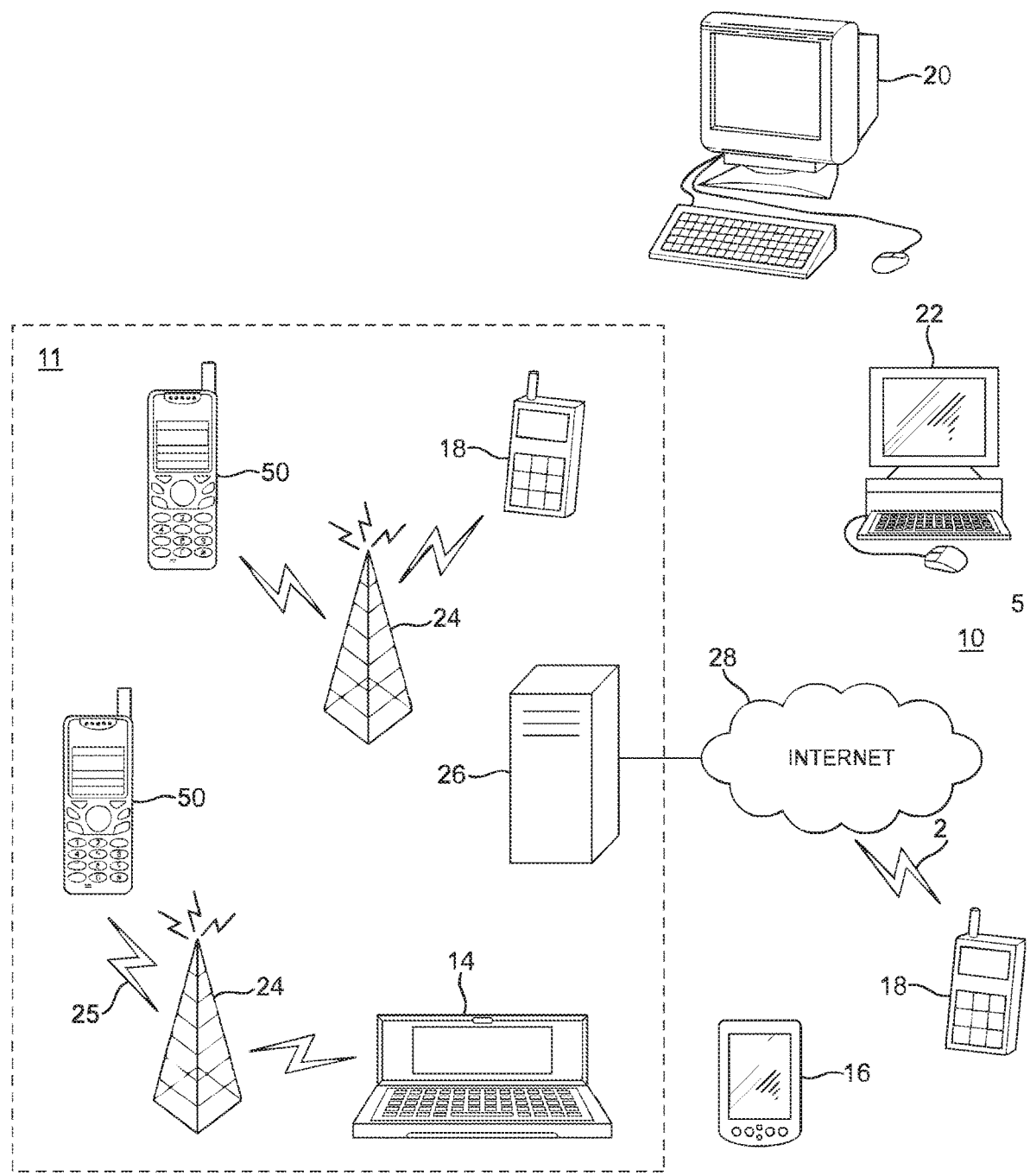
FIG. 3 further shows schematically electronic devices employing embodiments of the invention connected using wireless and wired network connections.

With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc.), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices and/or apparatus 50 suitable for implementing embodiments of the invention.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

The embodiments may also be implemented in a set-top box; i.e. a digital TV receiver, which may/may not have a display or wireless capabilities, in tablets or (laptop) personal computers (PC), which have hardware or software or combination of the encoder/decoder implementations, in various operating systems, and in chipsets, processors, DSPs and/or embedded systems offering hardware/software based coding.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

In telecommunications and data networks, a channel may refer either to a physical channel or to a logical channel. A physical channel may refer to a physical transmission medium such as a wire, whereas a logical channel may refer to a logical connection over a multiplexed medium, capable of conveying several logical channels. A channel may be used for conveying an information signal, for example a bitstream, from one or several senders (or transmitters) to one or several receivers.

An MPEG-2 transport stream (TS), specified in IS O/IEC 13818-1 or equivalently in ITU-T Recommendation H.222.0, is a format for carrying audio, video, and other media as well as program metadata or other metadata, in a multiplexed stream. A packet identifier (PID) is used to identify an elementary stream (a.k.a. packetized elementary stream) within the TS. Hence, a logical channel within an MPEG-2 TS may be considered to correspond to a specific PID value.

Available media file format standards include ISO base media file format (ISO/IEC 14496-12, which may be abbreviated ISOBMFF) and file format for NAL unit structured video (ISO/IEC 14496-15), which derives from the ISOBMFF.

Some concepts, structures, and specifications of ISOBMFF are described below as an example of a container file format, based on which the embodiments may be implemented. The aspects of the invention are not limited to ISOBMFF, but rather the description is given for one possible basis on top of which the invention may be partly or fully realized.

A basic building block in the ISO base media file format is called a box. Each box has a header and a payload. The box header indicates the type of the box and the size of the box in terms of bytes. A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes. According to the ISO family of file formats, a file includes media data and metadata that are encapsulated into boxes. Each box is identified by a four character code (4CC) and starts with a header which informs about the type and size of the box.

In files conforming to the ISO base media file format, the media data may be provided in a media data 'indat' box (also called MediaDataBox) and the movie 'moov' box (also called MovieBox) may be used to enclose the metadata. In some cases, for a file to be operable, both of the 'indat' and 'moov' boxes may be required to be present. The movie 'moov' box may include one or more tracks, and each track may reside in one corresponding track 'trak' box (also called TrackBox). A track may be one of the many types, including a media track that refers to samples formatted according to a media compression format (and its encapsulation to the ISO base media file format).

Movie fragments may be used e.g. when recording content to ISO files e.g. in order to avoid losing data if a recording application crashes, runs out of memory space, or some other incident occurs. Without movie fragments, data loss may occur because the file format may require that all metadata, e.g., the movie box, be written in one contiguous area of the file. Furthermore, when recording a file, there may not be sufficient amount of memory space (e.g., random access memory RAM) to buffer a movie box for the size of the storage available, and re-computing the contents of a movie box when the movie is closed may be too slow. Moreover, movie fragments may enable simultaneous recording and playback of a file using a regular ISO file parser. Furthermore, a smaller duration of initial buffering may be required for progressive downloading, e.g., simultaneous reception and playback of a file when movie fragments are used and the initial movie box is smaller compared to a file with the same media content but structured without movie fragments.

The movie fragment feature may enable splitting the metadata that otherwise might reside in the movie box into multiple pieces. Each piece may correspond to a certain period of time of a track. In other words, the movie fragment feature may enable interleaving file metadata and media data. Consequently, the size of the movie box may be limited and the use cases mentioned above be realized.

When present, MovieExtendsBox ('mvex') is contained in a MovieBox. Its presence warns readers that there might be movie fragments in this file or stream. To know of all samples in the tracks, movie fragments are obtained and scanned in order, and their information logically added to the information in the MovieBox. MovieExtendsBox contains one TrackExtendsBox per track. TrackExtendsBox contains default values used by the movie fragments. Among the default values that can be given in TrackExtendsBox are: default sample description index (i.e. default sample entry index), default sample duration, default sample size, and default sample flags. Sample flags comprise dependency information, such as if the sample depends on other sample(s), if other sample(s) depend on the sample, and if the sample is a sync sample.

In some examples, the media samples for the movie fragments may reside in an mdat box, if they are in the same file as the moov box. For the metadata of the movie fragments, however, a moof box (also called MovieFragmentBox) may be provided. The moof box may include the information for a certain duration of playback time that would previously have been in the moov box. The moov box may still represent a valid movie on its own, but in addition, it may include an mvex box indicating that movie fragments will follow in the same file. The movie fragments may extend the presentation that is associated to the moov box in time.

Within the movie fragment there may be a set of track fragments, including anywhere from zero to a plurality per track. The track fragments may in turn include anywhere from zero to a plurality of track runs, each of which document is a contiguous run of samples for that track. Within these structures, many fields are optional and can be defaulted. The metadata that may be included in the moof box may be limited to a subset of the metadata that may be included in a moov box and may be coded differently in some cases. Details regarding the boxes that can be included in a moof box may be found from the ISO base media file format specification.

TrackFragmentHeaderBox, contained in TrackFragmentBox, comprises sample_description_index that identifies which sample entry is in use in this track fragment.

Base data offset (base_data_offset in TrackFragmentHeaderBox) providing an explicit anchor for data offsets in track runs can be indicated. Alternatively, it can be indicated that the base data offsets (base_data_offset in TrackFragmentHeaderBox) for data references for the first track fragment are relative to the position of the first byte of the enclosing MovieFragmentBox and for subsequent track fragments the default base data offset is the end of the data defined by the preceding track fragment. Alternatively or additionally, it can be indicated for a track fragment that the base data offset (base_data_offset in TrackFragmentHeaderBox) is relative to the position of the first byte of the enclosing MovieFragmentBox.

A track fragment comprises one or more track fragment runs (a.k.a. track runs), each described by TrackRunBox. A track run documents a contiguous set of samples for a track, which is also a contiguous range of bytes of media data.

The syntax of the TrackRunBox in ISOBMFF is as follows:

```
aligned(8) class TrackRunBox
        extends FullBox('trun', version=0, tr_flags) {
  unsigned int(32)   sample_count;
  // the following are optional fields
  signed int(32) data_offset;
  unsigned int(32)   first_ sample_flags;
  // all fields in the following array are optional
  // as indicated by bits set in the tr_flags
  {
    unsigned int(32)   sample_duration;
    unsigned int(32)   sample_size;
    unsigned int(32)   sample_flags
    if (version == 0)
      { unsigned int(32)   sample_composition_time_offset; }
    else
```

-continued

```
      { signed int(32)   sample_composition_time_offset; }
  }[ sample_count ]
}
```

The presence of the optional fields is controlled by the values of tr_flags as follows:
  0x000001 data-offset-present.
  0x000004 first-sample-flags-present; this over-rides the default flags for the first sample only. This makes it possible to record a group of frames where the first is a key and the rest are difference frames, without supplying explicit flags for every sample. If this flag and field are used, sample-flags-present is required to be set equal to 0.
  0x000100 sample-duration-present: indicates that each sample has its own duration, otherwise the default is used.
  0x000200 sample-size-present: each sample has its own size, otherwise the default is used.
  0x000400 sample-flags-present; each sample has its own flags, otherwise the default is used.
  0x000800 sample-composition-time-offsets-present; each sample has a composition time offset (e.g. as used for I/P/B video in MPEG).

data_offset, when present, is added to the implicit or explicit (base) data offset established in the track fragment header. first_sample_flags provides the sample flags for the first sample of the track run.

The TrackFragmentBaseMediaDecodeTimeBox ('tfdt') provides the absolute decode time, measured on the decoding timeline, of the first sample in decoding order in the track fragment. This can be useful, for example, when performing random access in a file; it is not necessary to sum the sample durations of all preceding samples in previous fragments to find this value (where the sample durations are the deltas in the TimeToSampleBox and the sample_durations in the preceding track runs). TrackFragmentBaseMediaDecodeTimeBox may be contained in the TrackFragmentBox. The decode time of the first sample in decoding order in the track fragment may be referred to as baseMediaDecodeTime and may be provided as a 32- or 64-bit unsigned integer value.

A self-contained movie fragment may be defined to consist of a moof box and an mdat box that are consecutive in the file order and where the mdat box contains the samples of the movie fragment (for which the moof box provides the metadata) and does not contain samples of any other movie fragment (i.e. any other moof box).

The track reference mechanism can be used to associate tracks with each other. The TrackReferenceBox includes box(es), each of which provides a reference from the containing track to a set of other tracks. These references are labeled through the box type (i.e. the four-character code of the box) of the contained box(es).

The track grouping mechanism enables indication of groups of tracks, where each group shares a particular characteristic or the tracks within a group have a particular relationship. TrackGroupBox may be contained in a TrackBox. TrackGroupBox contains zero or more boxes derived from TrackGroupTypeBox. The particular characteristic or the relationship is indicated by the box type of the contained boxes. The contained boxes include an identifier, which can be used to conclude the tracks belonging to the same track group. The tracks that contain the same type of a contained box within the TrackGroupBox and have the same identifier value within these contained boxes belong to the same track group.

The ISO Base Media File Format contains three mechanisms for timed metadata that can be associated with particular samples: sample groups, timed metadata tracks, and sample auxiliary information. Derived specification may provide similar functionality with one or more of these three mechanisms.

A sample grouping in the ISO base media file format and its derivatives, such as the AVC file format and the SVC file format, may be defined as an assignment of each sample in a track to be a member of one sample group, based on a grouping criterion. A sample group in a sample grouping is not limited to being contiguous samples and may contain non-adjacent samples. As there may be more than one sample grouping for the samples in a track, each sample grouping may have a type field to indicate the type of grouping. Sample groupings may be represented by two linked data structures: (1) a SampleToGroupBox (sbgp box) represents the assignment of samples to sample groups; and (2) a SampleGroupDescriptionBox (sgpd box) contains a sample group entry for each sample group describing the properties of the group.

There may be multiple instances of the SampleToGroupBox and SampleGroupDescriptionBox based on different grouping criteria. These may be distinguished by a type field used to indicate the type of grouping. SampleToGroupBox may comprise a grouping_type_parameter field that can be used e.g. to indicate a sub-type of the grouping.

Several types of stream access points (SAPs) have been specified, including the following. SAP Type 1 corresponds to what is known in some coding schemes as a "Closed GOP random access point" (in which all pictures, in decoding order, can be correctly decoded, resulting in a continuous time sequence of correctly decoded pictures with no gaps) and in addition the first picture in decoding order is also the first picture in presentation order. SAP Type 2 corresponds to what is known in some coding schemes as a "Closed GOP random access point" (in which all pictures, in decoding order, can be correctly decoded, resulting in a continuous time sequence of correctly decoded pictures with no gaps), for which the first picture in decoding order may not be the first picture in presentation order. SAP Type 3 corresponds to what is known in some coding schemes as an "Open GOP random access point", in which there may be some pictures in decoding order that cannot be correctly decoded and have presentation times less than intra-coded picture associated with the SAP.

A stream access point (SAP) sample group as specified in ISOBMFF identifies samples as being of the indicated SAP type.

A sync sample may be defined as a sample corresponding to SAP type 1 or 2. A sync sample can be regarded as a media sample that starts a new independent sequence of samples; if decoding starts at the sync sample, it and succeeding samples in decoding order can all be correctly decoded, and the resulting set of decoded samples forms the correct presentation of the media starting at the decoded sample that has the earliest composition time. Sync samples can be indicated with the SyncSampleBox (for those samples whose metadata is present in a TrackBox) or within sample flags indicated or inferred for track fragment runs.

The Matroska file format is capable of (but not limited to) storing any of video, audio, picture, or subtitle tracks in one file. Matroska may be used as a basis format for derived file formats, such as WebM. Matroska uses Extensible Binary Meta Language (EBML) as basis. EBML specifies a binary and octet (byte) aligned format inspired by the principle of XML. EBML itself is a generalized description of the technique of binary markup. A Matroska file consists of Elements that make up an EBML "document." Elements incorporate an Element ID, a descriptor for the size of the element, and the binary data itself. Elements can be nested. A Segment Element of Matroska is a container for other top-level (level 1) elements. A Matroska file may comprise (but is not limited to be composed of) one Segment. Multimedia data in Matroska files is organized in Clusters (or Cluster Elements), each containing typically a few seconds of multimedia data. A Cluster comprises BlockGroup elements, which in turn comprise Block Elements. A Cues Element comprises metadata which may assist in random access or seeking and may include file pointers or respective timestamps for seek points.

Video codec consists of an encoder that transforms the input video into a compressed representation suited for storage/transmission and a decoder that can uncompress the compressed video representation back into a viewable form. A video encoder and/or a video decoder may also be separate from each other, i.e. need not form a codec. Typically encoder discards some information in the original video sequence in order to represent the video in a more compact form (that is, at lower bitrate).

Typical hybrid video encoders, for example many encoder implementations of ITU-T H.263 and H.264, encode the video information in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, i.e. the difference between the predicted block of pixels and the original block of pixels, is coded. This is typically done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

In temporal prediction, the sources of prediction are previously decoded pictures (a.k.a. reference pictures). In intra block copy (IBC; a.k.a. intra-block-copy prediction), prediction is applied similarly to temporal prediction but the reference picture is the current picture and only previously decoded samples can be referred in the prediction process. Inter-layer or inter-view prediction may be applied similarly to temporal prediction, but the reference picture is a decoded picture from another scalable layer or from another view, respectively. In some cases, inter prediction may refer to temporal prediction only, while in other cases inter prediction may refer collectively to temporal prediction and any of intra block copy, inter-layer prediction, and inter-view prediction provided that they are performed with the same or similar process than temporal prediction. Inter prediction or temporal prediction may sometimes be referred to as motion compensation or motion-compensated prediction.

Inter prediction, which may also be referred to as temporal prediction, motion compensation, or motion-compensated prediction, reduces temporal redundancy. In inter prediction the sources of prediction are previously decoded pictures. Intra prediction utilizes the fact that adjacent pixels within the same picture are likely to be correlated. Intra prediction can be performed in spatial or transform domain, i.e., either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

Figure 4:
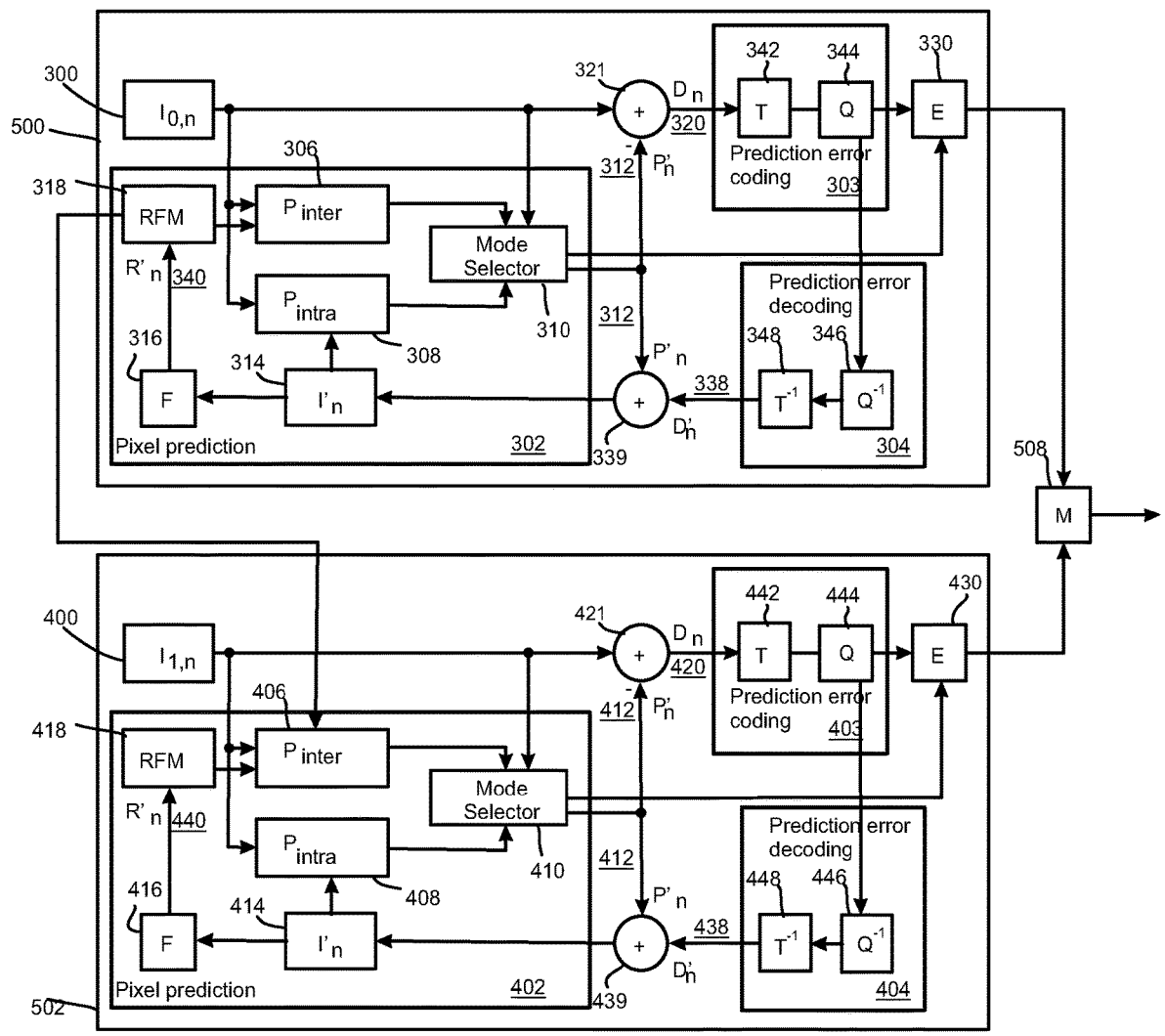
FIG. 4 shows schematically an encoder suitable for implementing embodiments of the invention.

FIG. 4 shows a block diagram of a video encoder suitable for employing embodiments of the invention. FIG. 4 presents an encoder for two layers, but it would be appreciated that presented encoder could be similarly extended to encode more than two layers. FIG. 4 illustrates an embodiment of a video encoder comprising a first encoder section 500 for a base layer and a second encoder section 502 for an enhancement layer. Each of the first encoder section 500 and the second encoder section 502 may comprise similar elements for encoding incoming pictures. The encoder sections 500, 502 may comprise a pixel predictor 302, 402, prediction error encoder 303, 403 and prediction error decoder 304, 404. FIG. 4 also shows an embodiment of the pixel predictor 302, 402 as comprising an inter-predictor 306, 406, an intra-predictor 308, 408, a mode selector 310, 410, a filter 316, 416, and a reference frame memory 318, 418. The pixel predictor 302 of the first encoder section 500 receives 300 base layer images of a video stream to be encoded at both the inter-predictor 306 (which determines the difference between the image and a motion compensated reference frame 318) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the base layer picture 300. Correspondingly, the pixel predictor 402 of the second encoder section 502 receives 400 enhancement layer images of a video stream to be encoded at both the inter-predictor 406 (which determines the difference between the image and a motion compensated reference frame 418) and the intra-predictor 408 (which determines a prediction for an image block based only on the already processed parts of current frame or picture). The output of both the inter-predictor and the intra-predictor are passed to the mode selector 410. The intra-predictor 408 may have more than one intra-prediction modes. Hence, each mode may perform the intra-prediction and provide the predicted signal to the mode selector 410. The mode selector 410 also receives a copy of the enhancement layer picture 400.

Depending on which encoding mode is selected to encode the current block, the output of the inter-predictor 306, 406 or the output of one of the optional intra-predictor modes or the output of a surface encoder within the mode selector is passed to the output of the mode selector 310, 410. The output of the mode selector is passed to a first summing device 321, 421. The first summing device may subtract the output of the pixel predictor 302, 402 from the base layer picture 300/enhancement layer picture 400 to produce a first prediction error signal 320, 420 which is input to the prediction error encoder 303, 403.

The pixel predictor 302, 402 further receives from a preliminary reconstructor 339, 439 the combination of the prediction representation of the image block 312, 412 and the output 338, 438 of the prediction error decoder 304, 404. The preliminary reconstructed image 314, 414 may be passed to the intra-predictor 308, 408 and to a filter 316, 416. The filter 316, 416 receiving the preliminary representation may filter the preliminary representation and output a final reconstructed image 340, 440 which may be saved in a reference frame memory 318, 418. The reference frame memory 318 may be connected to the inter-predictor 306 to be used as the reference image against which a future base layer picture 300 is compared in inter-prediction operations. Subject to the base layer being selected and indicated to be source for inter-layer sample prediction and/or inter-layer motion information prediction of the enhancement layer according to some embodiments, the reference frame memory 318 may also be connected to the inter-predictor 406 to be used as the reference image against which a future enhancement layer pictures 400 is compared in inter-prediction operations. Moreover, the reference frame memory 418 may be connected to the inter-predictor 406 to be used as the reference image against which a future enhancement layer picture 400 is compared in inter-prediction operations.

Filtering parameters from the filter 316 of the first encoder section 500 may be provided to the second encoder section 502 subject to the base layer being selected and indicated to be source for predicting the filtering parameters of the enhancement layer according to some embodiments.

The prediction error encoder 303, 403 comprises a transform unit 342, 442 and a quantizer 344, 444. The transform unit 342, 442 transforms the first prediction error signal 320, 420 to a transform domain. The transform is, for example, the DCT transform. The quantizer 344, 444 quantizes the transform domain signal, e.g. the DCT coefficients, to form quantized coefficients.

The prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414. The prediction error decoder may be considered to comprise a dequantizer 361, 461, which dequantizes the quantized coefficient values, e.g. DCT coefficients, to reconstruct the transform signal and an inverse transformation unit 363, 463, which performs the inverse transformation to the reconstructed transform signal wherein the output of the inverse transformation unit 363, 463 contains reconstructed block(s). The prediction error decoder may also comprise a block filter which may filter the reconstructed block(s) according to further decoded information and filter parameters.

The entropy encoder 330, 430 receives the output of the prediction error encoder 303, 403 and may perform a suitable entropy encoding/variable length encoding on the signal to provide error detection and correction capability. The outputs of the entropy encoders 330, 430 may be inserted into a bitstream e.g. by a multiplexer 508.

The H.264/AVC standard was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organisation for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, integrating new extensions or features to the specification. These extensions include Scalable Video Coding (SVC) and Multiview Video Coding (MVC).

Version 1 of the High Efficiency Video Coding (H.265/HEVC a.k.a. HEVC) standard was developed by the Joint Collaborative Team-Video Coding (JCT-VC) of VCEG and MPEG. The standard was published by both parent standardization organizations, and it is referred to as ITU-T Recommendation H.265 and ISO/IEC International Standard 23008-2, also known as MPEG-H Part 2 High Efficiency Video Coding (HEVC). Later versions of H.265/HEVC included scalable, multiview, fidelity range extensions, three-dimensional, and screen content coding extensions which may be abbreviated SHVC, MV-HEVC, REXT, 3D-HEVC, and SCC, respectively.

SHVC, MV-HEVC, and 3D-HEVC use a common basis specification, specified in Annex F of the version 2 of the HEVC standard. This common basis comprises for example high-level syntax and semantics e.g. specifying some of the characteristics of the layers of the bitstream, such as inter-layer dependencies, as well as decoding processes, such as reference picture list construction including inter-layer reference pictures and picture order count derivation for multi-layer bitstream. Annex F may also be used in potential subsequent multi-layer extensions of HEVC. It is to be understood that even though a video encoder, a video decoder, encoding methods, decoding methods, bitstream structures, and/or embodiments may be described in the following with reference to specific extensions, such as SHVC and/or MV-HEVC, they are generally applicable to any multi-layer extensions of HEVC, and even more generally to any multi-layer video coding scheme.

The standardization of the Versatile Video Coding (VVC, H.266, or H.266/VVC) standard has been started in the Joint Video Experts Team (WET) of ITU-T and MPEG. Some key definitions, bitstream and coding structures, and concepts of H.264/AVC and HEVC are described in this section as an example of a video encoder, decoder, encoding method, decoding method, and a bitstream structure, wherein the embodiments may be implemented. Some of the key definitions, bitstream and coding structures, and concepts of H.264/AVC are the same as in HEVC—hence, they are described below jointly. The aspects of the invention are not limited to H.264/AVC or HEVC, but rather the description is given for one possible basis on top of which the invention may be partly or fully realized. Many aspects described below in the context of H.264/AVC or HEVC may apply to VVC, and the aspects of the invention may hence be applied to VVC.

Similarly to many earlier video coding standards, the bitstream syntax and semantics as well as the decoding process for error-free bitstreams are specified in H.264/AVC and HEVC. The encoding process is not specified, but encoders must generate conforming bitstreams. Bitstream and decoder conformance can be verified with the Hypothetical Reference Decoder (HRD). The standards contain coding tools that help in coping with transmission errors and losses, but the use of the tools in encoding is optional and no decoding process has been specified for erroneous bitstreams.

The elementary unit for the input to an H.264/AVC or HEVC encoder and the output of an H.264/AVC or HEVC decoder, respectively, is a picture. A picture given as an input to an encoder may also be referred to as a source picture, and a picture decoded by a decoded may be referred to as a decoded picture.

The source and decoded pictures are each comprised of one or more sample arrays, such as one of the following sets of sample arrays:
  Luma (Y) only (monochrome).
  Luma and two chroma (YCbCr or YCgCo).
  Green, Blue and Red (GBR, also known as RGB).
  Arrays representing other unspecified monochrome or tri-stimulus color samplings (for example, YZX, also known as XYZ).

In the following, these arrays may be referred to as luma (or L or Y) and chroma, where the two chroma arrays may be referred to as Cb and Cr; regardless of the actual color representation method in use. The actual color representation method in use can be indicated e.g. in a coded bitstream e.g. using the Video Usability Information (VUI) syntax of H.264/AVC and/or HEVC. A component may be defined as an array or single sample from one of the three sample arrays (luma and two chroma) or the array or a single sample of the array that compose a picture in monochrome format.

In H.264/AVC and HEVC, a picture may either be a frame or a field. A frame comprises a matrix of luma samples and possibly the corresponding chroma samples. A field is a set of alternate sample rows of a frame and may be used as encoder input, when the source signal is interlaced. Chroma sample arrays may be absent (and hence monochrome sampling may be in use) or chroma sample arrays may be subsampled when compared to luma sample arrays. Chroma formats may be summarized as follows:
  In monochrome sampling there is only one sample array, which may be nominally considered the luma array.
  In 4:2:0 sampling, each of the two chroma arrays has half the height and half the width of the luma array.
  In 4:2:2 sampling, each of the two chroma arrays has the same height and half the width of the luma array.
  In 4:4:4 sampling when no separate color planes are in use, each of the two chroma arrays has the same height and width as the luma array.

In H.264/AVC and HEVC, it is possible to code sample arrays as separate color planes into the bitstream and respectively decode separately coded color planes from the bitstream. When separate color planes are in use, each one of them is separately processed (by the encoder and/or the decoder) as a picture with monochrome sampling.

A partitioning may be defined as a division of a set into subsets such that each element of the set is in exactly one of the subsets.

When describing the operation of HEVC encoding and/or decoding, the following terms may be used. A coding block may be defined as an N×N block of samples for some value of N such that the division of a coding tree block into coding blocks is a partitioning. A coding tree block (CTB) may be defined as an N×N block of samples for some value of N such that the division of a component into coding tree blocks is a partitioning. A coding tree unit (CTU) may be defined as a coding tree block of luma samples, two corresponding coding tree blocks of chroma samples of a picture that has three sample arrays, or a coding tree block of samples of a monochrome picture or a picture that is coded using three separate color planes and syntax structures used to code the samples. A coding unit (CU) may be defined as a coding block of luma samples, two corresponding coding blocks of chroma samples of a picture that has three sample arrays, or a coding block of samples of a monochrome picture or a picture that is coded using three separate color planes and syntax structures used to code the samples. A CU with the maximum allowed size may be named as LCU (largest coding unit) or coding tree unit (CTU) and the video picture is divided into non-overlapping LCUs.

A CU consists of one or more prediction units (PU) defining the prediction process for the samples within the CU and one or more transform units (TU) defining the prediction error coding process for the samples in the said CU. Typically, a CU consists of a square block of samples with a size selectable from a predefined set of possible CU sizes. Each PU and TU can be further split into smaller PUs and TUs in order to increase granularity of the prediction and prediction error coding processes, respectively. Each PU has prediction information associated with it defining what kind of a prediction is to be applied for the pixels within that PU (e.g. motion vector information for inter predicted PUs and intra prediction directionality information for intra predicted PUs).

Each TU can be associated with information describing the prediction error decoding process for the samples within the said TU (including e.g. DCT coefficient information). It is typically signalled at CU level whether prediction error coding is applied or not for each CU. In the case there is no prediction error residual associated with the CU, it can be considered there are no TUs for the said CU. The division of the image into CUs, and division of CUs into PUs and TUs is typically signalled in the bitstream allowing the decoder to reproduce the intended structure of these units.

In HEVC, a picture can be partitioned in tiles, which are rectangular and contain an integer number of LCUs. In HEVC, the partitioning to tiles forms a regular grid, where heights and widths of tiles differ from each other by one LCU at the maximum. In HEVC, a slice is defined to be an integer number of coding tree units contained in one independent slice segment and all subsequent dependent slice segments (if any) that precede the next independent slice segment (if any) within the same access unit. In HEVC, a slice segment is defined to be an integer number of coding tree units ordered consecutively in the tile scan and contained in a single NAL unit. The division of each picture into slice segments is a partitioning. In HEVC, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In HEVC, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. The CUs are scanned in the raster scan order of LCUs within tiles or within a picture, if tiles are not in use. Within an LCU, the CUs have a specific scan order.

An intra-coded slice (also called I slice) is such that only contains intra-coded blocks. The syntax of an I slice may exclude syntax elements that are related to inter prediction. An inter-coded slice is such where blocks can be intra- or inter-coded. Inter-coded slices may further be categorized into P and B slices, where P slices are such that blocks may be intra-coded or inter-coded but only using uni-prediction, and blocks in B slices may be intra-coded or inter-coded with uni- or bi-prediction.

A motion-constrained tile set (MCTS) is such that the inter prediction process is constrained in encoding such that no sample value outside the motion-constrained tile set, and no sample value at a fractional sample position that is derived using one or more sample values outside the motion-constrained tile set, is used for inter prediction of any sample within the motion-constrained tile set. Additionally, the encoding of an MCTS is constrained in a manner that motion vector candidates are not derived from blocks outside the MCTS. This may be enforced by turning off temporal motion vector prediction of HEVC, or by disallowing the encoder to use the TMVP candidate or any motion vector prediction candidate following the TMVP candidate in the merge or AMVP candidate list for PUs located directly left of the right tile boundary of the MCTS except the last one at the bottom right of the MCTS. In general, an MCTS may be defined to be a tile set that is independent of any sample values and coded data, such as motion vectors, that are outside the MCTS. In some cases, an MCTS may be required to form a rectangular area. It should be understood that depending on the context, an MCTS may refer to the tile set within a picture or to the respective tile set in a sequence of pictures. The respective tile set may be, but in general need not be, collocated in the sequence of pictures.

It is noted that sample locations used in inter prediction may be saturated by the encoding and/or decoding process so that a location that would be outside the picture otherwise is saturated to point to the corresponding boundary sample of the picture. Hence, if a tile boundary is also a picture boundary, in some use cases, encoders may allow motion vectors to effectively cross that boundary or a motion vector to effectively cause fractional sample interpolation that would refer to a location outside that boundary, since the sample locations are saturated onto the boundary. In other use cases, specifically if a coded tile may be extracted from a bitstream where it is located on a position adjacent to a picture boundary to another bitstream where the tile is located on a position that is not adjacent to a picture boundary, encoders may constrain the motion vectors on picture boundaries similarly to any MCTS boundaries.

The temporal motion-constrained tile sets SEI message of HEVC can be used to indicate the presence of motion-constrained tile sets in the bitstream.

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as prediction reference for the forthcoming frames in the video sequence.

The filtering may for example include one more of the following: deblocking, sample adaptive offset (SAO), and/or adaptive loop filtering (ALF). H.264/AVC includes a deblocking, whereas HEVC includes both deblocking and SAO.

In typical video codecs the motion information is indicated with motion vectors associated with each motion compensated image block, such as a prediction unit. Each of these motion vectors represents the displacement of the image block in the picture to be coded (in the encoder side) or decoded (in the decoder side) and the prediction source block in one of the previously coded or decoded pictures. In order to represent motion vectors efficiently those are typically coded differentially with respect to block specific predicted motion vectors. In typical video codecs the predicted motion vectors are created in a predefined way, for example calculating the median of the encoded or decoded motion vectors of the adjacent blocks. Another way to create motion vector predictions is to generate a list of candidate predictions from adjacent blocks and/or co-located blocks in temporal reference pictures and signalling the chosen candidate as the motion vector predictor. In addition to predicting the motion vector values, it can be predicted which reference picture(s) are used for motion-compensated prediction and this prediction information may be represented for example by a reference index of previously coded/decoded picture. The reference index is typically predicted from adjacent blocks and/or co-located blocks in temporal reference picture. Moreover, typical high efficiency video codecs employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signalled among a list of motion field candidate list filled with motion field information of available adjacent/co-located blocks.

In typical video codecs the prediction residual after motion compensation is first transformed with a transform kernel (like DCT) and then coded. The reason for this is that often there still exists some correlation among the residual and transform can in many cases help reduce this correlation and provide more efficient coding.

Typical video encoders utilize Lagrangian cost functions to find optimal coding modes, e.g. the desired coding mode for a block and associated motion vectors. This kind of cost function uses a weighting factor λ to tie together the (exact or estimated) image distortion due to lossy coding methods and the (exact or estimated) amount of information that is required to represent the pixel values in an image area:

$$C = D + \lambda R, \quad (1)$$

where C is the Lagrangian cost to be minimized, D is the image distortion (e.g. Mean Squared Error) with the mode and motion vectors considered, and R the number of bits needed to represent the required data to reconstruct the image block in the decoder (including the amount of data to represent the candidate motion vectors).

Video coding standards and specifications may allow encoders to divide a coded picture to coded slices or alike. In-picture prediction is typically disabled across slice boundaries. Thus, slices can be regarded as a way to split a coded picture to independently decodable pieces. In H.264/AVC and HEVC, in-picture prediction may be disabled across slice boundaries. Thus, slices can be regarded as a way to split a coded picture into independently decodable pieces, and slices are therefore often regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighboring CU may be regarded as unavailable for intra prediction, if the neighboring CU resides in a different slice.

An elementary unit for the output of an H.264/AVC or HEVC encoder and the input of an H.264/AVC or HEVC decoder, respectively, is a Network Abstraction Layer (NAL) unit. For transport over packet-oriented networks or storage into structured files, NAL units may be encapsulated into packets or similar structures. A bytestream format has been specified in H.264/AVC and HEVC for transmission or storage environments that do not provide framing structures. The bytestream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention may always be performed regardless of whether the bytestream format is in use or not. A NAL unit may be defined as a syntax structure containing an indication of the type of data to follow and bytes containing that data in the form of an RBSP interspersed as necessary with emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

NAL units consist of a header and payload. In H.264/AVC and HEVC, the NAL unit header indicates the type of the NAL unit In HEVC, a two-byte NAL unit header is used for all specified NAL unit types. The NAL unit header contains one reserved bit, a six-bit NAL unit type indication, a three-bit nuh_temporal_id_plus1 indication for temporal level (may be required to be greater than or equal to 1) and a six-bit nuh_layer_id syntax element. The temporal_id_plus1 syntax element may be regarded as a temporal identifier for the NAL unit, and a zero-based TemporalId variable may be derived as follows: TemporalId=temporal_id_plus1−1. The abbreviation TID may be used to interchangeably with the TemporalId variable. TemporalId equal to 0 corresponds to the lowest temporal level. The value of temporal_id_plus1 is required to be non-zero in order to avoid start code emulation involving the two NAL unit header bytes. The bitstream created by excluding all VCL NAL units having a TemporalId greater than or equal to a selected value and including all other VCL NAL units remains conforming. Consequently, a picture having TemporalId equal to tid_value does not use any picture having a TemporalId greater than tid_value as inter prediction reference. A sub-layer or a temporal sub-layer may be defined to be a temporal scalable layer (or a temporal layer, TL) of a temporal scalable bitstream, consisting of VCL NAL units with a particular value of the TemporalId variable and the associated non-VCL NAL units. nuh_layer_id can be understood as a scalability layer identifier.

NAL units can be categorized into Video Coding Layer (VCL) NAL units and non-VCL NAL units. VCL NAL units are typically coded slice NAL units. In HEVC, VCL NAL units contain syntax elements representing one or more CU.

In HEVC, abbreviations for picture types may be defined as follows: trailing (TRAIL) picture, Temporal Sub-layer Access (TSA), Step-wise Temporal Sub-layer Access (STSA), Random Access Decodable Leading (RADL) picture, Random Access Skipped Leading (RASL) picture, Broken Link Access (BLA) picture, Instantaneous Decoding Refresh (IDR) picture, Clean Random Access (CRA) picture.

A Random Access Point (RAP) picture, which may also be referred to as an intra random access point (IRAP) picture in an independent layer contains only intra-coded slices. An IRAP picture belonging to a predicted layer may contain P, B, and I slices, cannot use inter prediction from other pictures in the same predicted layer, and may use inter-layer prediction from its direct reference layers. In the present version of HEVC, an IRAP picture may be a BLA picture, a CRA picture or an IDR picture. The first picture in a bitstream containing a base layer is an IRAP picture at the base layer. Provided the necessary parameter sets are available when they need to be activated, an IRAP picture at an independent layer and all subsequent non-RASL pictures at the independent layer in decoding order can be correctly decoded without performing the decoding process of any pictures that precede the IRAP picture in decoding order. The IRAP picture belonging to a predicted layer and all subsequent non-RASL pictures in decoding order within the same predicted layer can be correctly decoded without performing the decoding process of any pictures of the same predicted layer that precede the IRAP picture in decoding order, when the necessary parameter sets are available when they need to be activated and when the decoding of each direct reference layer of the predicted layer has been initialized. There may be pictures in a bitstream that contain only intra-coded slices that are not IRAP pictures.

A non-VCL NAL unit may be for example one of the following types: a sequence parameter set, a picture parameter set, a supplemental enhancement information (SEI) NAL unit, an access unit delimiter, an end of sequence NAL unit, an end of bitstream NAL unit, or a filler data NAL unit. Parameter sets may be needed for the reconstruction of decoded pictures, whereas many of the other non-VCL NAL units are not necessary for the reconstruction of decoded sample values.

Parameters that remain unchanged through a coded video sequence may be included in a sequence parameter set. In addition to the parameters that may be needed by the decoding process, the sequence parameter set may optionally contain video usability information (VUI), which includes parameters that may be important for buffering, picture output timing, rendering, and resource reservation. In HEVC a sequence parameter set RBSP includes parameters that can be referred to by one or more picture parameter set RBSPs or one or more SEI NAL units containing a buffering period SEI message. A picture parameter set contains such parameters that are likely to be unchanged in several coded pictures. A picture parameter set RBSP may include parameters that can be referred to by the coded slice NAL units of one or more coded pictures.

In HEVC, a video parameter set (VPS) may be defined as a syntax structure containing syntax elements that apply to zero or more entire coded video sequences as determined by the content of a syntax element found in the SPS referred to by a syntax element found in the PPS referred to by a syntax element found in each slice segment header.

A video parameter set RBSP may include parameters that can be referred to by one or more sequence parameter set RBSPs.

The relationship and hierarchy between video parameter set (VPS), sequence parameter set (SPS), and picture parameter set (PPS) may be described as follows. VPS resides one level above SPS in the parameter set hierarchy and in the context of scalability and/or 3D video. VPS may include parameters that are common for all slices across all (scalability or view) layers in the entire coded video sequence. SPS includes the parameters that are common for all slices in a particular (scalability or view) layer in the entire coded video sequence, and may be shared by multiple (scalability or view) layers. PPS includes the parameters that are common for all slices in a particular layer representation (the representation of one scalability or view layer in one access unit) and are likely to be shared by all slices in multiple layer representations.

VPS may provide information about the dependency relationships of the layers in a bitstream, as well as many other information that are applicable to all slices across all (scalability or view) layers in the entire coded video sequence. VPS may be considered to comprise two parts, the base VPS and a VPS extension, where the VPS extension may be optionally present.

Out-of-band transmission, signaling or storage can additionally or alternatively be used for other purposes than tolerance against transmission errors, such as ease of access or session negotiation. For example, a sample entry of a track in a file conforming to the ISO Base Media File Format may comprise parameter sets, while the coded data in the bitstream is stored elsewhere in the file or in another file. The phrase along the bitstream (e.g. indicating along the bitstream) may be used in claims and described embodiments to refer to out-of-band transmission, signaling, or storage in a manner that the out-of-band data is associated with the bitstream. The phrase decoding along the bitstream or alike may refer to decoding the referred out-of-band data (which may be obtained from out-of-band transmission, signaling, or storage) that is associated with the bitstream.

A SEI NAL unit may contain one or more SEI messages, which are not required for the decoding of output pictures but may assist in related processes, such as picture output timing, rendering, error detection, error concealment, and resource reservation. Several SEI messages are specified in H.264/AVC and HEVC, and the user data SEI messages enable organizations and companies to specify SEI messages for their own use. H.264/AVC and HEVC contain the syntax and semantics for the specified SEI messages but no process for handling the messages in the recipient is defined. Consequently, encoders are required to follow the H.264/AVC standard or the HEVC standard when they create SEI messages, and decoders conforming to the H.264/AVC standard or the HEVC standard, respectively, are not required to process SEI messages for output order conformance. One of the reasons to include the syntax and semantics of SEI messages in H.264/AVC and HEVC is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

In HEVC, there are two types of SEI NAL units, namely the suffix SEI NAL unit and the prefix SEI NAL unit, having a different nal_unit_type value from each other. The SEI message(s) contained in a suffix SEI NAL unit are associated with the VCL NAL unit preceding, in decoding order, the suffix SEI NAL unit. The SEI message(s) contained in a prefix SEI NAL unit are associated with the VCL NAL unit following, in decoding order, the prefix SEI NAL unit.

A coded picture is a coded representation of a picture. In HEVC, a coded picture may be defined as a coded representation of a picture containing all coding tree units of the picture. In HEVC, an access unit (AU) may be defined as a set of NAL units that are associated with each other according to a specified classification rule, are consecutive in decoding order, and contain at most one picture with any specific value of nuh_layer_id. In addition to containing the VCL NAL units of the coded picture, an access unit may also contain non-VCL NAL units. Said specified classification rule may for example associate pictures with the same output time or picture output count value into the same access unit.

A bitstream may be defined as a sequence of bits, in the form of a NAL unit stream or a byte stream, that forms the representation of coded pictures and associated data forming one or more coded video sequences. A first bitstream may be followed by a second bitstream in the same logical channel, such as in the same file or in the same connection of a communication protocol. An elementary stream (in the context of video coding) may be defined as a sequence of one or more bitstreams. The end of the first bitstream may be indicated by a specific NAL unit, which may be referred to as the end of bitstream (EOB) NAL unit and which is the last NAL unit of the bitstream. In HEVC and its current draft extensions, the EOB NAL unit is required to have nuh_layer_id equal to 0.

A coded video sequence may be defined as such a sequence of coded pictures in decoding order that is independently decodable and is followed by another coded video sequence or the end of the bitstream or an end of sequence NAL unit.

In HEVC, a coded video sequence may additionally or alternatively (to the specification above) be specified to end, when a specific NAL unit, which may be referred to as an end of sequence (EOS) NAL unit, appears in the bitstream and has nuh_layer_id equal to 0.

A group of pictures (GOP) and its characteristics may be defined as follows. A GOP can be decoded regardless of whether any previous pictures were decoded. An open GOP is such a group of pictures in which pictures preceding the initial intra picture in output order might not be correctly decodable when the decoding starts from the initial intra picture of the open GOP. In other words, pictures of an open GOP may refer (in inter prediction) to pictures belonging to a previous GOP. An HEVC decoder can recognize an intra picture starting an open GOP, because a specific NAL unit type, CRA NAL unit type, may be used for its coded slices. A closed GOP is such a group of pictures in which all pictures can be correctly decoded when the decoding starts from the initial intra picture of the closed GOP. In other words, no picture in a closed GOP refers to any pictures in previous GOPs. In H.264/AVC and HEVC, a closed GOP may start from an IDR picture. In HEVC a closed GOP may also start from a BLA_W_RADL or a BLA_N_LP picture. An open GOP coding structure is potentially more efficient in the compression compared to a closed GOP coding structure, due to a larger flexibility in selection of reference pictures.

A Structure of Pictures (SOP) may be defined as one or more coded pictures consecutive in decoding order, in which the first coded picture in decoding order is a reference picture at the lowest temporal sub-layer and no coded picture except potentially the first coded picture in decoding order is a RAP picture. All pictures in the previous SOP precede in decoding order all pictures in the current SOP and all pictures in the next SOP succeed in decoding order all pictures in the current SOP. A SOP may represent a hierarchical and repetitive inter prediction structure. The term group of pictures (GOP) may sometimes be used interchangeably with the term SOP and having the same semantics as the semantics of SOP.

A Decoded Picture Buffer (DPB) may be used in the encoder and/or in the decoder. There are two reasons to buffer decoded pictures, for references in inter prediction and for reordering decoded pictures into output order. As H.264/AVC and HEVC provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as a reference and is not needed for output.

In many coding modes of H.264/AVC and HEVC, the reference picture for inter prediction is indicated with an index to a reference picture list. The index may be coded with variable length coding, which usually causes a smaller index to have a shorter value for the corresponding syntax element. In H.264/AVC and HEVC, two reference picture lists (reference picture list 0 and reference picture list 1) are generated for each bi-predictive (B) slice, and one reference picture list (reference picture list 0) is formed for each inter-coded (P) slice.

A reference picture list, such as the reference picture list 0 and the reference picture list 1, may be constructed in two steps: First, an initial reference picture list is generated. The initial reference picture list may be generated for example on the basis of frame_num, POC, temporal_id, or information on the prediction hierarchy such as a GOP structure, or any combination thereof. Second, the initial reference picture list may be reordered by reference picture list reordering (RPLR) syntax, also known as reference picture list modification syntax structure, which may be contained in slice headers. The initial reference picture lists may be modified through the reference picture list modification syntax structure, where pictures in the initial reference picture lists may be identified through an entry index to the list.

Many coding standards, including H.264/AVC and HEVC, may have decoding process to derive a reference picture index to a reference picture list, which may be used to indicate which one of the multiple reference pictures is used for inter prediction for a particular block. A reference picture index may be coded by an encoder into the bitstream is some inter coding modes or it may be derived (by an encoder and a decoder) for example using neighboring blocks in some other inter coding modes.

Several candidate motion vectors may be derived for a single prediction unit. For example, motion vector prediction HEVC includes two motion vector prediction schemes, namely the advanced motion vector prediction (AMVP) and the merge mode. In the AMVP or the merge mode, a list of motion vector candidates is derived for a PU. There are two kinds of candidates: spatial candidates and temporal candidates, where temporal candidates may also be referred to as TMVP candidates.

A candidate list derivation may be performed for example as follows, while it should be understood that other possibilities may exist for candidate list derivation. If the occupancy of the candidate list is not at maximum, the spatial candidates are included in the candidate list first if they are available and not already exist in the candidate list. After that, if occupancy of the candidate list is not yet at maximum, a temporal candidate is included in the candidate list. If the number of candidates still does not reach the maximum allowed number, the combined bi-predictive candidates (for B slices) and a zero motion vector are added in. After the candidate list has been constructed, the encoder decides the final motion information from candidates for example based on a rate-distortion optimization (RDO) decision and encodes the index of the selected candidate into the bitstream. Likewise, the decoder decodes the index of the selected candidate from the bitstream, constructs the candidate list, and uses the decoded index to select a motion vector predictor from the candidate list.

A motion vector anchor position may be defined as a position (e.g., horizontal and vertical coordinates) within a picture area relative to which the motion vector is applied. A horizontal offset and a vertical offset for the anchor position may be given in the slice header, slice parameter set, tile header, tile parameter set, or the like.

An example encoding method taking advantage of a motion vector anchor position comprises: encoding an input picture into a coded constituent picture; reconstructing, as a part of said encoding, a decoded constituent picture corresponding to the coded constituent picture; encoding a spatial region into a coded tile, the encoding comprising: determining a horizontal offset and a vertical offset indicative of a region-wise anchor position of the spatial region within the decoded constituent picture; encoding the horizontal offset and the vertical offset; determining that a prediction unit at position of a first horizontal coordinate and a first vertical coordinate of the coded tile is predicted relative to the region-wise anchor position, wherein the first horizontal coordinate and the first vertical coordinate are horizontal and vertical coordinates, respectively, within the spatial region; indicating that the prediction unit is predicted relative to a prediction-unit anchor position that is relative to the region-wise anchor position; deriving a prediction-unit anchor position equal to sum of the first horizontal coordinate and the horizontal offset, and the first vertical coordinate and the vertical offset, respectively; determining a motion vector for the prediction unit; and applying the motion vector relative to the prediction-unit anchor position to obtain a prediction block.

An example decoding method wherein a motion vector anchor position is used comprises: decoding a coded tile into a decoded tile, the decoding comprising: decoding a horizontal offset and a vertical offset; decoding an indication that a prediction unit at position of a first horizontal coordinate and a first vertical coordinate of the coded tile is predicted relative to a prediction-unit anchor position that is relative to the horizontal and vertical offset; deriving a prediction-unit anchor position equal to sum of the first horizontal coordinate and the horizontal offset, and the first vertical coordinate and the vertical offset, respectively; determining a motion vector for the prediction unit; and applying the motion vector relative to the prediction-unit anchor position to obtain a prediction block.

Scalable video coding may refer to coding structure where one bitstream can contain multiple representations of the content, for example, at different bitrates, resolutions or frame rates. In these cases the receiver can extract the desired representation depending on its characteristics (e.g. resolution that matches best the display device). Alternatively, a server or a network element can extract the portions of the bitstream to be transmitted to the receiver depending on e.g. the network characteristics or processing capabilities of the receiver. A meaningful decoded representation can be produced by decoding only certain parts of a scalable bit stream. A scalable bitstream typically consists of a "base layer" providing the lowest quality video available and one or more enhancement layers that enhance the video quality when received and decoded together with the lower layers. In order to improve coding efficiency for the enhancement layers, the coded representation of that layer typically depends on the lower layers. E.g. the motion and mode information of the enhancement layer can be predicted from lower layers. Similarly the pixel data of the lower layers can be used to create prediction for the enhancement layer.

In some scalable video coding schemes, a video signal can be encoded into a base layer and one or more enhancement layers. An enhancement layer may enhance, for example, the temporal resolution (i.e., the frame rate), the spatial resolution, or simply the quality of the video content represented by another layer or part thereof. Each layer together with all its dependent layers is one representation of the video signal, for example, at a certain spatial resolution, temporal resolution and quality level. In this document, we refer to a scalable layer together with all of its dependent layers as a "scalable layer representation". The portion of a scalable bitstream corresponding to a scalable layer representation can be extracted and decoded to produce a representation of the original signal at certain fidelity.

Scalability modes or scalability dimensions may include but are not limited to the following:

Quality scalability: Base layer pictures are coded at a lower quality than enhancement layer pictures, which may be achieved for example using a greater quantization parameter value (i.e., a greater quantization step size for transform coefficient quantization) in the base layer than in the enhancement layer. Quality scalability may be further categorized into fine-grain or fine-granularity scalability (FGS), medium-grain or medium-granularity scalability (MGS), and/or coarse-grain or coarse-granularity scalability (CGS), as described below.

Spatial scalability: Base layer pictures are coded at a lower resolution (i.e. have fewer samples) than enhancement layer pictures. Spatial scalability and quality scalability, particularly its coarse-grain scalability type, may sometimes be considered the same type of scalability.

View scalability, which may also be referred to as multiview coding. The base layer represents a first view, whereas an enhancement layer represents a second view. A view may be defined as a sequence of pictures representing one camera or viewpoint. It may be considered that in stereoscopic or two-view video, one video sequence or view is presented for the left eye while a parallel view is presented for the right eye.

Depth scalability, which may also be referred to as depth-enhanced coding. A layer or some layers of a bitstream may represent texture view(s), while other layer or layers may represent depth view(s).

It should be understood that many of the scalability types may be combined and applied together.

The term layer may be used in context of any type of scalability, including view scalability and depth enhancements. An enhancement layer may refer to any type of an enhancement, such as SNR, spatial, multiview, and/or depth enhancement. A base layer may refer to any type of a base video sequence, such as a base view, a base layer for SNR/spatial scalability, or a texture base view for depth-enhanced video coding.

A sender, a gateway, a client, or another entity may select the transmitted layers and/or sub-layers of a scalable video bitstream. Terms layer extraction, extraction of layers, or layer down-switching may refer to transmitting fewer layers than what is available in the bitstream received by the sender, the gateway, the client, or another entity. Layer up-switching may refer to transmitting additional layer(s) compared to those transmitted prior to the layer up-switching by the sender, the gateway, the client, or another entity, i.e. restarting the transmission of one or more layers whose transmission was ceased earlier in layer down-switching. Similarly to layer down-switching and/or up-switching, the sender, the gateway, the client, or another entity may perform down- and/or up-switching of temporal sub-layers. The sender, the gateway, the client, or another entity may also perform both layer and sub-layer down-switching and/or up-switching. Layer and sub-layer down-switching and/or up-switching may be carried out in the same access unit or alike (i.e. virtually simultaneously) or may be carried out in different access units or alike (i.e. virtually at distinct times).

A scalable video encoder for quality scalability (also known as Signal-to-Noise or SNR) and/or spatial scalability may be implemented as follows. For a base layer, a conventional non-scalable video encoder and decoder may be used. The reconstructed/decoded pictures of the base layer are included in the reference picture buffer and/or reference picture lists for an enhancement layer. In case of spatial scalability, the reconstructed/decoded base-layer picture may be upsampled prior to its insertion into the reference picture lists for an enhancement-layer picture. The base layer decoded pictures may be inserted into a reference picture list(s) for coding/decoding of an enhancement layer picture similarly to the decoded reference pictures of the enhancement layer. Consequently, the encoder may choose a base-layer reference picture as an inter prediction reference and indicate its use with a reference picture index in the coded bitstream. The decoder decodes from the bitstream, for example from a reference picture index, that a base-layer picture is used as an inter prediction reference for the enhancement layer. When a decoded base-layer picture is used as the prediction reference for an enhancement layer, it is referred to as an inter-layer reference picture.

While the previous paragraph described a scalable video codec with two scalability layers with an enhancement layer and a base layer, it needs to be understood that the description can be generalized to any two layers in a scalability hierarchy with more than two layers. In this case, a second enhancement layer may depend on a first enhancement layer in encoding and/or decoding processes, and the first enhancement layer may therefore be regarded as the base layer for the encoding and/or decoding of the second enhancement layer. Furthermore, it needs to be understood that there may be inter-layer reference pictures from more than one layer in a reference picture buffer or reference picture lists of an enhancement layer, and each of these inter-layer reference pictures may be considered to reside in a base layer or a reference layer for the enhancement layer being encoded and/or decoded. Furthermore, it needs to be understood that other types of inter-layer processing than reference-layer picture upsampling may take place instead or additionally. For example, the bit-depth of the samples of the reference-layer picture may be converted to the bit-depth of the enhancement layer and/or the sample values may undergo a mapping from the color space of the reference layer to the color space of the enhancement layer.

A scalable video coding and/or decoding scheme may use multi-loop coding and/or decoding, which may be characterized as follows. In the encoding/decoding, a base layer picture may be reconstructed/decoded to be used as a motion-compensation reference picture for subsequent pictures, in coding/decoding order, within the same layer or as a reference for inter-layer (or inter-view or inter-component) prediction. The reconstructed/decoded base layer picture may be stored in the DPB. An enhancement layer picture may likewise be reconstructed/decoded to be used as a motion-compensation reference picture for subsequent pictures, in coding/decoding order, within the same layer or as reference for inter-layer (or inter-view or inter-component) prediction for higher enhancement layers, if any. In addition to reconstructed/decoded sample values, syntax element values of the base/reference layer or variables derived from the syntax element values of the base/reference layer may be used in the inter-layer/inter-component/inter-view prediction.

Inter-layer prediction may be defined as prediction in a manner that is dependent on data elements (e.g., sample values or motion vectors) of reference pictures from a different layer than the layer of the current picture (being encoded or decoded). Many types of inter-layer prediction exist and may be applied in a scalable video encoder/decoder. The available types of inter-layer prediction may for example depend on the coding profile according to which the bitstream or a particular layer within the bitstream is being encoded or, when decoding, the coding profile that the bitstream or a particular layer within the bitstream is indicated to conform to. Alternatively or additionally, the available types of inter-layer prediction may depend on the types of scalability or the type of an scalable codec or video coding standard amendment (e.g. SHVC, MV-HEVC, or 3D-HEVC) being used.

A direct reference layer may be defined as a layer that may be used for inter-layer prediction of another layer for which the layer is the direct reference layer. A direct predicted layer may be defined as a layer for which another layer is a direct reference layer. An indirect reference layer may be defined as a layer that is not a direct reference layer of a second layer but is a direct reference layer of a third layer that is a direct reference layer or indirect reference layer of a direct reference layer of the second layer for which the layer is the indirect reference layer. An indirect predicted layer may be defined as a layer for which another layer is an indirect reference layer. An independent layer may be defined as a layer that does not have direct reference layers. In other words, an independent layer is not predicted using inter-layer prediction. A non-base layer may be defined as any other layer than the base layer, and the base layer may be defined as the lowest layer in the bitstream. An independent non-base layer may be defined as a layer that is both an independent layer and a non-base layer.

Similarly to MVC, in MV-HEVC, inter-view reference pictures can be included in the reference picture list(s) of the current picture being coded or decoded. SHVC uses multi-loop decoding operation (unlike the SVC extension of H.264/AVC). SHVC may be considered to use a reference index based approach, i.e. an inter-layer reference picture can be included in a one or more reference picture lists of the current picture being coded or decoded (as described above).

For the enhancement layer coding, the concepts and coding tools of HEVC base layer may be used in SHVC, MV-HEVC, and/or alike. However, the additional inter-layer prediction tools, which employ already coded data (including reconstructed picture samples and motion parameters a.k.a motion information) in reference layer for efficiently coding an enhancement layer, may be integrated to SHVC, MV-HEVC, and/or alike codec.

A constituent picture may be defined as such part of an enclosing (de)coded picture that corresponds to a representation of an entire input picture. In addition to the constituent picture, the enclosing (de)coded picture may comprise other data, such as another constituent picture.

Frame packing may be defined to comprise arranging more than one input picture, which may be referred to as (input) constituent frames or constituent pictures, into an output picture. In general, frame packing is not limited to any particular type of constituent frames or the constituent frames need not have a particular relation with each other. In many cases, frame packing is used for arranging constituent frames of a stereoscopic video clip into a single picture sequence. The arranging may include placing the input pictures in spatially non-overlapping areas within the output picture. For example, in a side-by-side arrangement, two input pictures are placed within an output picture horizontally adjacently to each other. The arranging may also include partitioning of one or more input pictures into two or more constituent frame partitions and placing the constituent frame partitions in spatially non-overlapping areas within the output picture. The output picture or a sequence of frame-packed output pictures may be encoded into a bitstream e.g. by a video encoder. The bitstream may be decoded e.g. by a video decoder. The decoder or a post-processing operation after decoding may extract the decoded constituent frames from the decoded picture(s) e.g. for displaying.

Video coding specifications may contain a set of constraints for associating data units (e.g. NAL units in H.264/AVC or HEVC) into access units. These constraints may be used to conclude access unit boundaries from a sequence of NAL units. For example, the following is specified in the HEVC standard:

An access unit consists of one coded picture with nuh_layer_id equal to 0, zero or more VCL NAL units with nuh_layer_id greater than 0 and zero or more non-VCL NAL units.

Let firstBlPicNalUnit be the first VCL NAL unit of a coded picture with nuh_layer_id equal to 0. The first of any of the following NAL units preceding firstBlPicNalUnit and succeeding the last VCL NAL unit preceding firstBlPicNalUnit, if any, specifies the start of a new access unit:

access unit delimiter NAL unit with nuh_layer_id equal to 0 (when present),

VPS NAL unit with nuh_layer_id equal to 0 (when present),

SPS NAL unit with nuh_layer_id equal to 0 (when present),

PPS NAL unit with nuh_layer_id equal to 0 (when present),

Prefix SEI NAL unit with nuh_layer_id equal to 0 (when present),

NAL units with nal_unit_type in the range of RSV_NVCL41 . . . RSV_NVCL44 with nuh_layer_id equal to 0 (when present), NAL units with nal_unit_type in the range of UNSPEC48 . . . UNSPEC55 with nuh_layer_id equal to 0 (when present).

The first NAL unit preceding firstBlPicNalUnit and succeeding the last VCL NAL unit preceding firstBlPicNalUnit, if any, can only be one of the above-listed NAL units.

When there is none of the above NAL units preceding firstBlPicNalUnit and succeeding the last VCL NAL preceding firstBlPicNalUnit, if any, firstBlPicNalUnit starts a new access unit.

Access unit boundary detection may be based on but may not be limited to one or more of the following:

Detecting that a VCL NAL unit of a base-layer picture is the first VCL NAL unit of an access unit, e.g. on the basis that:

the VCL NAL unit includes a block address or alike that is the first block of the picture in decoding order; and/or the picture order count, picture number, or similar decoding or output order or timing indicator differs from that of the previous VCL NAL unit(s).

Having detected the first VCL NAL unit of an access unit, concluding based on pre-defined rules e.g. based on nal_unit_type which non-VCL NAL units that precede the first VCL NAL unit of an access unit and succeed the last VCL NAL unit of the previous access unit in decoding order belong to the access unit.

Extractors specified in ISO/IEC 14496-15 for H.264/AVC and HEVC enable compact formation of tracks that extract NAL unit data by reference. An extractor is a NAL-unit-like structure. A NAL-unit-like structure may be specified to comprise a NAL unit header and NAL unit payload like any NAL units, but start code emulation prevention (that is required for a NAL unit) might not be followed in a NAL-unit-like structure. For HEVC, an extractor contains one or more constructors. A sample constructor extracts, by reference, NAL unit data from a sample of another track. An in-line constructor includes NAL unit data. When an extractor is processed by a file reader that requires it, the extractor is logically replaced by the bytes resulting when resolving the contained constructors in their appearance order. Nested extraction may be disallowed, e.g. the bytes referred to by a sample constructor shall not contain extractors; an extractor shall not reference, directly or indirectly, another extractor. An extractor may contain one or more constructors for extracting data from the current track or from another track that is linked to the track in which the extractor resides by means of a track reference of type 'scal'. An extractor sample may be defined as a sample that comprises one or more extractors.

The bytes of a resolved extractor are one of the following:
a) One entire NAL unit; note that when an Aggregator is referenced, both the included and referenced bytes are copied
b) More than one entire NAL unit In both cases the bytes of the resolved extractor start with a valid length field and a NAL unit header.

The bytes of a sample constructor are copied only from the single identified sample in the track referenced through the indicated 'scal' track reference. The alignment is on decoding time, i.e. using the time-to-sample table only, followed by a counted offset in sample number. Extractors are a media-level concept and hence apply to the destination track before any edit list is considered. However, one would normally expect that the edit lists in the two tracks would be identical.

The following syntax may be used:
class aligned(8) Extractor ( ) {
  NALUnitHeader( );
  do {
    unsigned int(8) constructor_type;
    if(constructor_type==0)
      SampleConstructor( );
    else if(constructor_type==2)
      InlineConstructor( );
  } while(!EndOfNALUnit( ))
}

The semantics may be defined as follows:
NALUnitHeader( ): The first two bytes of HEVC NAL units. A particular nal_unit_type value indicates an extractor, e.g. nal_unit_type equal to 49.
constructor_type specifies the constructor being used.
EndOfNALUnit( ) is a function that returns 0 (false) when more data follows in this extractor; otherwise it returns 1 (true).

The sample constructor (SampleConstructor) may have the following syntax:
```
class aligned(8) SampleConstructor ( ) {
  unsigned int(8) track_ref_index;
  signed int(8) sample_offset;
  unsigned int((lengthSizeMinusOne+1)*8)
    data_offset;
  unsigned int((lengthSizeMinusOne+1)*8)
    data_length;
}
```
track_ref_index identifies the source track from which data is extracted. track_ref_index is the index of the track reference of type 'scal'. The first track reference has the index value 1; the value 0 is reserved.

The sample in that track from which data is extracted is temporally aligned or nearest preceding in the media decoding timeline, i.e. using the time-to-sample table only, adjusted by an offset specified by sample_offset with the sample containing the extractor. sample_offset gives the relative index of the sample in the linked track that shall be used as the source of information. Sample 0 (zero) is the sample with the same, or the closest preceding, decoding time compared to the decoding time of the sample containing the extractor; sample 1 (one) is the next sample, sample −1 (minus 1) is the previous sample, and so on.

data_offset: The offset of the first byte within the reference sample to copy. If the extraction starts with the first byte of data in that sample, the offset takes the value 0. LengthSizeMinusOne may be provided in the sample entry.

data_length: The number of bytes to copy. If this field takes the value 0, data_offset may be required to refer to the beginning of a NAL unit length field and the entire single referenced NAL unit is copied (i.e. the length to copy is taken from the length field referenced by data_offset, augmented by the additional bytes field in the case of Aggregators). When data_offset+data_length is greater than the size of the sample, the bytes from the byte pointed to by data_offset until the end of the sample, inclusive, are copied, i.e. data_length is resolved as (sample size−data_offset). Resolution of an extractor may result in a reconstructed payload for which there are fewer bytes than what is indicated in the NALUnitLength of the first NAL in that reconstructed payload. In such cases, readers may be required to assume that only a single NAL unit was reconstructed by the extractors, and rewrite the NALUnitLength of that NAL to the appropriate value (i.e, size of the reconstructed payload minus (LengthSizeMinusOne+1)).

The syntax of the in-line constructor may be specified as follows:
```
class aligned(8) InlineConstructor ( ) {
  unsigned int(8) length;
  unsigned int(8) inline_data[length];
}
```
wherein length is the number of bytes that belong to the InlineConstructor following this field, and inline_data is the data bytes to be returned when resolving the in-line constructor.

A tile track may be defined as a track that contains sequences of one or more motion-constrained tile sets of a coded bitstream. Decoding of a tile track without the other tile tracks of the bitstream may require a specialized decoder, which may be e.g. required to skip absent tiles in the decoding process. An HEVC tile track specified in ISO/IEC 14496-15 enables storage of one or more temporal motion-constrained tile set as a track. When a tile track contains tiles of an HEVC base layer, the sample entry type 'hvt1' is used. When a tile track contains tiles of a non-base layer, the sample entry type 'lht1' is used. A sample of a tile track consists of one or more complete tiles in one or more complete slice segments. A tile track is independent from any other tile track that includes VCL NAL units of the same layer as this tile track. A tile track has a 'tbas' track reference to a tile base track. The tile base track does not include VCL NAL units. A tile base track indicates the tile ordering using a 'sabt' track reference to the tile tracks. An HEVC coded picture corresponding to a sample in the tile base track can be reconstructed by collecting the coded data from the time-aligned samples of the tracks indicated by the 'sabt' track reference in the order of the track references. It can therefore be understood that a tile base track includes coded video data of the referenced tile tracks by reference.

A sample according to ISO/IEC 14496-15 comprises one or more length-field-delimited NAL units. The length field may be referred to as NALULength or NALUnitLength. The NAL units in samples do not begin with start codes, but rather the length fields are used for concluding NAL unit boundaries. The scheme of length-field-delimited NAL units may also be referred to as length-prefixed NAL units.

A sub-picture may be defined as a picture that represents a spatial subset of the original video content, which has been split into spatial subsets before video encoding at the content production side. A sub-picture bitstream may be defined as a bitstream that represents a spatial subset of the original video content, which has been split into spatial subsets before video encoding at the content production side. A sub-picture track may be defined as a track that is with spatial relationships to other track(s) originating from the same original video content and that represents a sub-picture bitstream. A sub-picture track conforms to the a conventional track format, such as 'hvc1' or 'hev1' defined for HEVC in ISO/IEC 14496-15. In an approach to generate sub-picture tracks, a source picture sequence is split into sub-picture sequences before encoding. A sub-picture sequence is then encoded independently from other sub-picture sequences as a single-layer bitstream, such as HEVC Main profile bitstream. The coded single-layer bitstream is encapsulated into a sub-picture track. The bitstream for a sub-picture track may be encoded with motion-constrained pictures, as defined later. In another approach to generate sub-picture tracks, a source picture sequence is encoded with motion-constrained tile sets into a bitstream, and a sub-picture track is generated by converting the MCTS sequence into a conforming bitstream e.g. through slice header modifications and encapsulating the generated bitstream into a track. Sub-picture tracks generated this way comprise motion-constrained pictures. Several bitstreams may be encoded from the same sub-picture sequence, e.g. for different bitrates.

A collector track may be defined as a track that extracts implicitly or explicitly MCTSs or sub-pictures from other tracks. When resolved by a file reader, a collector track may represent a bitstream conforming to a video codec specification, such as HEVC. A collector track may for example extract MCTSs or sub-pictures to form a coded picture sequence where MCTSs or sub-pictures are arranged to a grid. For example, when a collector track extracts two MCTSs or sub-pictures, they may be arranged into a 2×1 grid of MCTSs or sub-pictures. A tile base track may be regarded as a collector track, and an extractor track that extracts MCTSs or sub-pictures from other tracks may be regarded as a collector track. A collector track may also be referred to as a collection track. A track that is a source for extracting to a collector track may be referred to as a collection item track.

To avoid creating an excessive number of extractor tracks (e.g., to avoid creating an extractor track for each combination of high-resolution and low-resolution tiles), tracks that are alternatives for extraction may be grouped with a mechanism described in the following. Likewise, to enable the use of the same tile base track for collocated tile tracks representing different bitrate versions of the same content, the following mechanism may be used.

A file writer indicates in a file that a track group, e.g. referred to as 'alte' track group, contains tracks that are alternatives to be used as a source for extraction.

The identifier for the 'alte' group may be taken from the same numbering space as the identifier for tracks. In other words, the identifier for the 'alte' group may be required to differ from all the track identifier values. Consequently, the 'alte' track group identifier may be used in places where track identifier is conventionally used. Specifically, the 'alte' track group identifier may be used as a track reference indicating the source for extraction.

Members of the track group formed by this box are alternatives to be used as a source for extraction. Members of the track group with track_group_type equal to 'alte' are alternatives to be used as a source for 'scal' or 'sabt' track reference. A TrackReferenceTypeBox of reference_type equal to track_ref_4cc may list the track group id value(s) of an 'alte' track group(s) of containing the same alte track_ref_4cc value in addition to or instead of track ID values. For example, an extractor track may, through a 'scal' track reference, point to an 'alte' track group in addition to or instead of individual tracks. Any single track of the 'alte' track group is a suitable source for extraction. The source track for extraction may be changed at a position where the track switched to has a sync sample or a SAP sample of type 1 or 2.

A uniform resource identifier (URI) may be defined as a string of characters used to identify a name of a resource. Such identification enables interaction with representations of the resource over a network, using specific protocols. A URI is defined through a scheme specifying a concrete syntax and associated protocol for the URI. The uniform resource locator (URL) and the uniform resource name (URN) are forms of URI. A URL may be defined as a URI that identifies a web resource and specifies the means of acting upon or obtaining the representation of the resource, specifying both its primary access mechanism and network location. A URN may be defined as a URI that identifies a resource by name in a particular namespace. A URN may be used for identifying a resource without implying its location or how to access it.

In many video communication or transmission systems, transport mechanisms, and multimedia container file formats, there are mechanisms to transmit or store a scalability layer separately from another scalability layer of the same bitstream, e.g. to transmit or store the base layer separately from the enhancement layer(s). It may be considered that layers are stored in or transmitted through separate logical channels. For example in ISOBMFF, the base layer can be stored as a track and each enhancement layer can be stored in another track, which may be linked to the base-layer track using so-called track references.

Many video communication or transmission systems, transport mechanisms, and multimedia container file formats provide means to associate coded data of separate logical channels, such as of different tracks or sessions, with each other. For example, there are mechanisms to associate coded data of the same access unit together. For example, decoding or output times may be provided in the container file format or transport mechanism, and coded data with the same decoding or output time may be considered to form an access unit.

Recently, Hypertext Transfer Protocol (HTTP) has been widely used for the delivery of real-time multimedia content over the Internet, such as in video streaming applications. Unlike the use of the Real-time Transport Protocol (RTP) over the User Datagram Protocol (UDP), HTTP is easy to configure and is typically granted traversal of firewalls and network address translators (NAT), which makes it attractive for multimedia streaming applications.

Chunked HTTP delivery enables servers to respond to an HTTP GET request in multiple parts. However, chunked HTTP delivery does not remove the inherent encoding and encapsulation delay caused by creating self-standing movie fragments. Chunked HTTP delivery is specified in IETF RFC 7230.

Several commercial solutions for adaptive streaming over HTTP, such as Microsoft® Smooth Streaming, Apple® Adaptive HTTP Live Streaming and Adobe® Dynamic Streaming, have been launched as well as standardization projects have been carried out. Adaptive HTTP streaming (AHS) was first standardized in Release 9 of 3rd Generation Partnership Project (3GPP) packet-switched streaming (PSS) service (3GPP TS 26.234 Release 9: "Transparent end-to-end packet-switched streaming service (PSS); protocols and codecs"). MPEG took 3GPP AHS Release 9 as a starting point for the MPEG DASH standard (ISO/IEC 23009-1: "Dynamic adaptive streaming over HTTP (DASH)-Part 1: Media presentation description and segment formats," International Standard, $2^{nd}$ Edition, 2014). 3GPP continued to work on adaptive HTTP streaming in communication with MPEG and published 3GP-DASH (Dynamic Adaptive Streaming over HTTP; 3GPP TS 26.247: "Transparent end-to-end packet-switched streaming Service (PSS); Progressive download and dynamic adaptive Streaming over HTTP (3GP-DASH)". MPEG DASH and 3GP-DASH are technically close to each other and may therefore be collectively referred to as DASH. Streaming systems similar to MPEG-DASH include for example HTTP Live Streaming (a.k.a. HLS), specified in the IETF RFC 8216. For a detailed description of said adaptive streaming system, all providing examples of a video streaming system, wherein the embodiments may be implemented, a reference is made to the above standard documents. The aspects of the invention are not limited to the above standard documents but rather the description is given for one possible basis on top of which the invention may be partly or fully realized.

In DASH, the multimedia content may be stored on an HTTP server and may be delivered using HTTP. The content may be stored on the server in two parts: Media Presentation Description (MPD), which describes a manifest of the available content, its various alternatives, their URL addresses, and other characteristics; and segments, which contain the actual multimedia bitstreams in the form of chunks, in a single or multiple files. The MDP provides the necessary information for clients to establish a dynamic adaptive streaming over HTTP. The MPD contains information describing media presentation, such as an HTTP-uniform resource locator (URL) of each Segment to make GET Segment request. To play the content, the DASH client may obtain the MPD e.g. by using HTTP, email, thumb drive, broadcast, or other transport methods. By parsing the MPD, the DASH client may become aware of the program timing, media-content availability, media types, resolutions, minimum and maximum bandwidths, and the existence of various encoded alternatives of multimedia components, accessibility features and required digital rights management (DRM), media-component locations on the network, and other content characteristics. Using this information, the DASH client may select the appropriate encoded alternative and start streaming the content by fetching the segments using e.g. HTTP GET requests. After appropriate buffering to allow for network throughput variations, the client may continue fetching the subsequent segments and also monitor the network bandwidth fluctuations. The client may decide how to adapt to the available bandwidth by fetching segments of different alternatives (with lower or higher bitrates) to maintain an adequate buffer.

In the context of DASH, the following definitions may be used: A media content component or a media component may be defined as one continuous component of the media content with an assigned media component type that can be encoded individually into a media stream. Media content may be defined as one media content period or a contiguous sequence of media content periods. Media content component type may be defined as a single type of media content such as audio, video, or text. A media stream may be defined as an encoded version of a media content component.

In DASH, a hierarchical data model is used to structure media presentation as follows. A media presentation consists of a sequence of one or more Periods, each Period contains one or more Groups, each Group contains one or more Adaptation Sets, each Adaptation Sets contains one or more Representations, each Representation consists of one or more Segments. A Group may be defined as a collection of Adaptation Sets that are not expected to be presented simultaneously. An Adaptation Set may be defined as a set of interchangeable encoded versions of one or several media content components. A Representation is one of the alternative choices of the media content or a subset thereof typically differing by the encoding choice, e.g. by bitrate, resolution, language, codec, etc. The Segment contains certain duration of media data, and metadata to decode and present the included media content. A Segment is identified by a URI and can typically be requested by a HTTP GET request. A Segment may be defined as a unit of data associated with an HTTP-URL and optionally a byte range that are specified by an MPD.

An Initialization Segment may be defined as a Segment containing metadata that is necessary to present the media streams encapsulated in Media Segments. In ISOBMFF based segment formats, an Initialization Segment may comprise the Movie Box ('moov') which might not include metadata for any samples, i.e. any metadata for samples is provided in 'moof' boxes.

A Media Segment contains certain duration of media data for playback at a normal speed, such duration is referred as Media Segment duration or Segment duration. The content producer or service provider may select the Segment duration according to the desired characteristics of the service. For example, a relatively short Segment duration may be used in a live service to achieve a short end-to-end latency. The reason is that Segment duration is typically a lower bound on the end-to-end latency perceived by a DASH client since a Segment is a discrete unit of generating media data for DASH. Content generation is typically done such a manner that a whole Segment of media data is made available for a server. Furthermore, many client implementations use a Segment as the unit for GET requests. Thus, in typical arrangements for live services a Segment can be requested by a DASH client only when the whole duration of Media Segment is available as well as encoded and encapsulated into a Segment. For on-demand service, different strategies of selecting Segment duration may be used.

A Segment may be further partitioned into Subsegments e.g. to enable downloading segments in multiple parts. Subsegments may be required to contain complete access units. Subsegments may be indexed by Segment Index box, which contains information to map presentation time range and byte range for each Subsegment. The Segment Index box may also describe subsegments and stream access points in the segment by signaling their durations and byte offsets. A DASH client may use the information obtained from Segment Index box(es) to make a HTTP GET request for a specific Subsegment using byte range HTTP request. If relatively long Segment duration is used, then Subsegments may be used to keep the size of HTTP responses reasonable and flexible for bitrate adaptation. The indexing information of a segment may be put in the single box at the beginning of that segment, or spread among many indexing boxes in the segment. Different methods of spreading are possible, such as hierarchical, daisy chain, and hybrid. This technique may avoid adding a large box at the beginning of the segment and therefore may prevent a possible initial download delay.

DASH supports rate adaptation by dynamically requesting Media Segments from different Representations within an Adaptation Set to match varying network bandwidth. When a DASH client switches up/down Representation, coding dependencies within Representation have to be taken into account. A Representation switch may only happen at a random access point (RAP), which is typically used in video coding techniques such as H.264/AVC. In DASH, a more general concept named Stream Access Point (SAP) is introduced to provide a codec-independent solution for accessing a Representation and switching between Representations. In DASH, a SAP is specified as a position in a Representation that enables playback of a media stream to be started using only the information contained in Representation data starting from that position onwards (preceded by initialising data in the Initialisation Segment, if any). Hence, Representation switching can be performed in SAP.

An end-to-end system for DASH may be described as follows. The media content is provided by an origin server, which may be a conventional web (HTTP) server. The origin server may be connected with a Content Delivery Network (CDN) over which the streamed content is delivered to and stored in edge servers. The MPD allows signaling of multiple base URLs for the content, which can be used to announce the availability of the content in different edge servers. Alternatively, the content server may be directly connected to the Internet. Web proxies may reside on the path of routing the HTTP traffic between the DASH clients and the origin or edge server from which the content is requested. Web proxies cache HTTP messages and hence can serve clients' requests with the cached content. They are commonly used by network service providers, since they reduce the required network bandwidth from the proxy towards origin or edge servers. For end-users HTTP caching provides shorter latency. DASH clients are connected to the Internet through an access network, such as a mobile cellular network. The mobile network may comprise mobile edge servers or mobile edge cloud, operating similarly to a CDN edge server and/or web proxy.

When using tile/sub-picture tracks as described above for encapsulating the media data, the byte count of file format samples of tile/sub-picture tracks can be very small, just few tens of bytes, when a fine tile grid is used. The overhead of file format metadata for movie fragments, most notably TrackRunBox can be significant. For example, when hierarchical inter prediction is used in video tracks, both sample size and sample composition time offset are present in TrackRunBox, and thus the TrackRunBox occupies at least 8 bytes per sample.

Extractor tracks are used to merge sub-picture tracks in a manner that the resulting bitstream is conforming to the underlying video format (e.g. H.264/AVC or HEVC). The sample size in extractor tracks can be significant, e.g. 10 to 20 bytes per extracted sub-picture track, given that the byte count of file format samples of sub-picture tracks can be very small, just few tens of bytes, when a fine tile grid is used.

A sample in an extractor track that merges sub-picture tracks typically contains the following:
  NAL unit header of the extractor: 2 bytes
  Per each extracted tile/sub-picture track: in-line constructor for the rewritten slice header
  Per each extracted tile/sub-picture track: sample-constructor, which may be e.g. 7 bytes for 2-byte length and offset fields A target in low-latency live streaming is to minimize the end-to-end delay from capture to display. In the encoding end, all pictures of a movie fragment have to be encoded before the MovieFragmentBox can be authored. Thus, there is an inherent delay equal to the movie fragment duration in the encoding end. The movie fragment duration is usually the same as the segment duration in DASH, i.e., a usual strategy is to have exactly one movie fragment per segment. It is allowed to create multiple movie fragments per segment, but that comes with a byte count overhead cost.

The following boxes are present at each self-contained movie fragment:
  MovieFragmentBox: 8 bytes
  MovieFragmentHeaderBox: 16 bytes
  TrackFragmentBox: 8 bytes
  TrackFragmentHeaderBox: 16 to 40 bytes
  One or more TrackRunBox(es), varying size of greater than or equal to 16 bytes
  Zero or more SampleGroupDesctiptionBox(es)
  Zero or more SampleToGroupBox(es)
  One or more MediaDataBox(es), each with 8-byte box header Thus, the byte count overhead of introducing a self-contained (compared to extending the previous movie fragment in samples) is at least 8+16+8+16+16+8=72 bytes and typically somewhat more due to optional fields or boxes being present. If a movie fragment is established for each picture and the picture rate is 30 Hz, the minimum bitrate overhead is about 17 kbps compared to having one movie fragment per second. Such an overhead is significant particularly for tile/sub-picture tracks when a fine tile grid is used.

Now an improved method and related apparatus is introduced for reducing the overhead.

Figure 5:
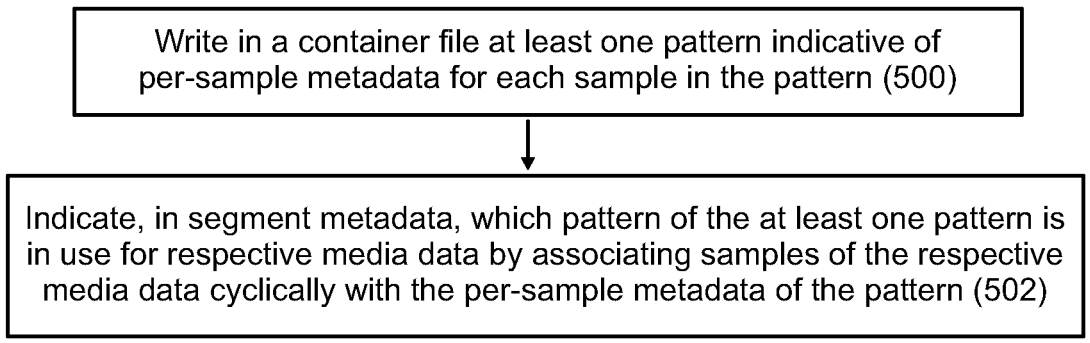
FIG. 5 shows a flow chart of an encoding method according to an embodiment of the invention.

The method according to an aspect, as shown in FIG. 5, comprises writing (500) in a container file at least one pattern indicative of per-sample metadata for each sample in the pattern; and indicating (502), in segment metadata, which pattern of the at least one pattern is in use for respective media data by associating samples of the respective media data cyclically with the per-sample metadata of the pattern. Accordingly, the file contains one or more patterns of per-sample metadata and enables compact track fragment runs that give a reference to the pattern that is used to associate per-sample metadata cyclically to the samples of the track fragment run. In an example, a per-sample metadata pattern has three elements denoted as $e_1$, $e_2$, $e_3$, and a track fragment run has seven samples denoted as $s_1$, $s_2$, $s_3$, ..., $s_7$. The per-sample metadata is assigned to the samples cyclically, i.e., $s_1$ is assigned with $e_1$, $s_2$ with $e_2$, $s_3$ with $e_3$, $s_4$ with $e_1$, $s_5$ with $e_2$, $s_6$ with $e_3$, and $s_7$ with $e_1$.

Figure 6:
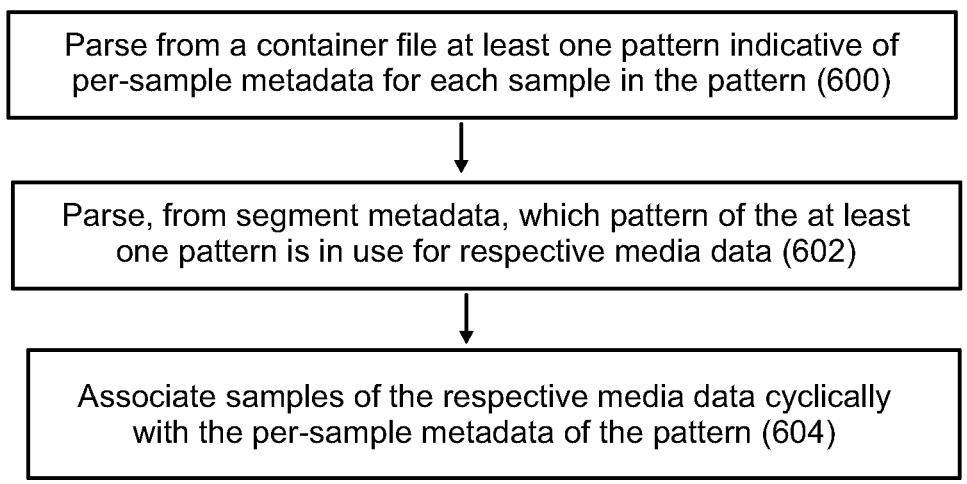
FIG. 6 shows a flow chart of a parsing method according to an embodiment of the invention.

The per-sample metadata may comprise but is not limited to one or more of the following:
  a set of sample flags, e.g. for indicating dependency and/or sync sample
  number of bits, nibbles, or bytes for indicating the sample size
  timing information, such as but not limited to
    sample duration or other information indicative of decoding time or decoding time difference from the previous sample
    sample composition time offset or other information indicative of the composition time or composition time difference that may be relative to the decoding time The method according to an aspect, as shown in FIG. 6, comprises parsing (600) from a container file at least one pattern indicative of per-sample metadata for each sample in the pattern; parsing (602), from segment metadata, which pattern of the at least one pattern is in use for respective media data; and associating (604) samples of the respective media data cyclically with the per-sample metadata of the pattern.

According to an embodiment, the container file is structured according to ISOBMFF, and the method further comprises writing in the container file one or more patterns comprising both TrackRunBox metadata and the bit/nibble/byte count of sample size; and including in the TrackRunBox per-sample signalling of sample size.

Thus, patterns of per-sample metadata are provided prior to the TrackRunBox. Containers for the patterns of per-sample metadata may include but are not limited to one or both of MovieExtendsBox and MovieFragmentBox. MovieExtendsBox may be preferred, since it could enable sharing of the same patterns among multiple tracks and/or is present in the DASH Initialization Segment and is hence delivered prior to Media Segments.

A per-sample metadata pattern may correspond to a structure of pictures. For example, a structure of pictures comprising a hierarchy of a first number of pictures may be assigned to a first per-sample metadata pattern, and a structure of pictures comprising a hierarchy of a second number of pictures may be assigned to a second per-sample metadata pattern, wherein the first number differs from the second number.

There are several options for handling RAP pictures (or, likewise, intra-coded pictures) in indications related to per-sample metadata patterns and TrackRunBox. The options include but are not limited to the following:
  Including a RAP picture in a per-sample metadata pattern that also includes other pictures, e.g. a complete structure of pictures. As consequence of this option, it may be required to indicate another per-sample metadata pattern for the same other pictures.

Including a RAP picture in a per-sample metadata pattern that also includes other pictures, e.g. a complete structure of pictures, indicating that the per-sample metadata pattern starts with a picture that applies conditionally for the first sample of a track run only, and indicating for a track run (e.g. with a particular box flag of the TrackRunBox) whether the first entry in the per-sample metadata pattern applies for the first sample of the track run. In an example, a per-sample metadata pattern has three elements denoted as $e_1$, $e_2$, $e_3$, where the first entry is indicated to apply conditionally to the first sample of a track run, and a track fragment run has seven samples denoted as $s_1$, $s_2$, $s_3$, ..., $s_7$, and it is indicated that the first entry in the per-sample metadata pattern applies for the first sample of the track run. The per-sample metadata is assigned to the samples cyclically excluding $e_1$ except for the first sample, i.e., $s_1$ is assigned with $e_1$, $s_2$ with $e_2$, $s_3$ with $e_3$, $s_4$ with $e_2$, $s_5$ with $e_3$, $s_6$ with $e_2$, and $s_7$ with $e_3$.

Including a RAP picture in a per-sample metadata pattern that does not contain other pictures, and indicating exactly one per-sample metadata pattern per track run. As consequence of this option, it may be required to specify a track run that only contains a RAP picture.

Including a RAP picture in a per-sample metadata pattern that does not contain other pictures, allowing to indicate an initial per-sample metadata pattern that is applied once for the initial samples of the track run, and indicating the per-sample metadata pattern applied to the remaining samples of the track run. The presence of the initial per-sample metadata pattern indication in a track run may be controlled for example through a particular box flag of the TrackRunBox.

Allowing to indicate sample metadata for the first sample of a track run directly in the TrackRunBox, and indicating the per-sample metadata pattern applied to the remaining samples of the track run. The presence of the sample metadata for the first sample in the TrackRunBox may be controlled for example through a particular box flag of the TrackRunBox. Thus, as controlled by the file author, track fragment runs may start with an intra-coded picture for which metadata is given separately from the metadata of a picture pattern. The metadata for the frames starting the track fragment run may be provided prior to TrackRunBox, preferably in the MovieExtendsBox, but may also be present in the MovieFragmentBox.

According to an embodiment, in addition to indicating which per-sample metadata pattern applies, a start index for the per-sample metadata pattern is indicated or inferred. The start index is applied only for the first cycle of the cyclic assignment of per-sample metadata to the sample of the track run. In an example, a per-sample metadata pattern has three elements denoted as $e_1$, $e_2$, $e_3$, and a track fragment run has seven samples denoted as $s_1$, $s_2$, $s_3$, ..., $s_7$, and a start index equal to 2 is indicated in the TrackRunBox. The per-sample metadata is assigned to the samples cyclically starting from $e_2$, i.e., Si is assigned with $e_2$, $s_2$ with $e_3$, $s_3$ with $e_1$, $s_4$ with $e_2$, $s_5$ with $e_3$, $s_6$ with $e_1$, and $s_7$ with $e_2$.

According to an embodiment, the container file comprises at least one pattern of default extractors, and the method further comprises cyclically assigning samples of an extractor track to the at least one pattern, and assigning the default extractors in a pattern of the at least one pattern to extractors of a sample of the extractor track. Thus, compact extractor tracks are enabled.

If several tracks share the same patterns of extractor samples, the patterns may be included in a syntax structure that is shared by several tracks, such as MovieExtendsBox. If only one or few tracks share the same patterns of extractor samples or if the patterns are relatively small in byte count, they may be included in a track-specific syntax structure, such as TrackFragmentBox.

According to an embodiment, the method further comprises indicating that a sample offset for a track fragment run is kept unchanged. The indication may be carried e.g. in a box header flag of TrackRunBox. Thus, the indication causes the same sample data to be assigned to all samples of the track fragment run. This embodiment could be used for example when the same sample content is suitable for all extractor samples of a track fragment run.

The method, when applied for low-latency live streaming, avoids the need of encoding all media samples of a movie fragment before being able to transmit the movie fragment. Compared to creating very short movie fragments, the presented method avoids the byte count overhead. Embodiments of the method for low-latency live streaming are described below.

According to an embodiment, the method further comprises compiling a streaming manifest indicating separate URLs for a segment header and a corresponding segment payload. The streaming manifest, such as DASH MPD, may provide the URL templates, or a URL template scheme to append the base URLs given in the MPD may be indicated to be applicable.

According to an embodiment, the streaming manifest may further indicate that the data in the segment payload is tightly packed and in decoding order. The segment payload may refer, for example, to the MediaDataBox. Packing tightly refers to all bytes of the segment payload belonging to the video bitstream, i.e. that the segment payload consists of a contiguous range of bytes of the video bitstream. Such indication may be provided e.g. as a supplemental property in DASH MPD. The video bitstream in the segment payload may be an encapsulated video bitstream. For example, the segment payload may consist of a contiguous set of samples of a video track of an ISOBMFF file.

The segments may be authored using per-sample metadata patterns as described above. The size of the segment header is estimated based on the segment duration. The value of the offset applying to the first sample of the segment, which may be indicated, for example, as base_data_offset in TrackFragmentHeaderBox, is generated accordingly. An encapsulator may need to write FreeBox(es) at the end of the TrackFragmentBox, if the encoding is terminated suddenly.

An initial byte range of the segment header may be made available for HTTP chunked transfer encoding by a server entity. The initial byte range is indicative of the pattern of per-sample metadata that applies to the segment payload. The initial byte range excludes at least some of the sample sizes. The initial byte range may for example comprise an initial part of a MovieFragmentBox, up to but excluding a sample size list in a TrackRunBox. Segment payload may be made available for HTTP chunked transfer encoding for example for each hierarchical structure of pictures.

The server or the server entity in various embodiments may for example be but is not limited to one of the following:
An origin server
An edge server of a content delivery network (CDN)
A proxy server A mobile edge cloud, e.g. operating in a 5G mobile network A media gateway A home server A processing device, such as a personal computer or a game console, which may be connected to a viewing device, such as a head-mounted display According to an embodiment, low latency players may use parallel HTTP connections to fetch the segment header and segment payload separately. According to an embodiment, legacy players may use conventional URLs to fetch full segments with header and payload.

When segment headers and payloads are requested separately, the low-latency server may operate as follows:

The server uses HTTP chunked transfer encoding for the segment header part by sending initial byte range in one chunk and sending the remainder of the TrackRunBox only when the movie fragment is finalized.

The server uses HTTP chunked transfer encoding for the segment payload on e.g. structure of pictures basis.

Figure 7:
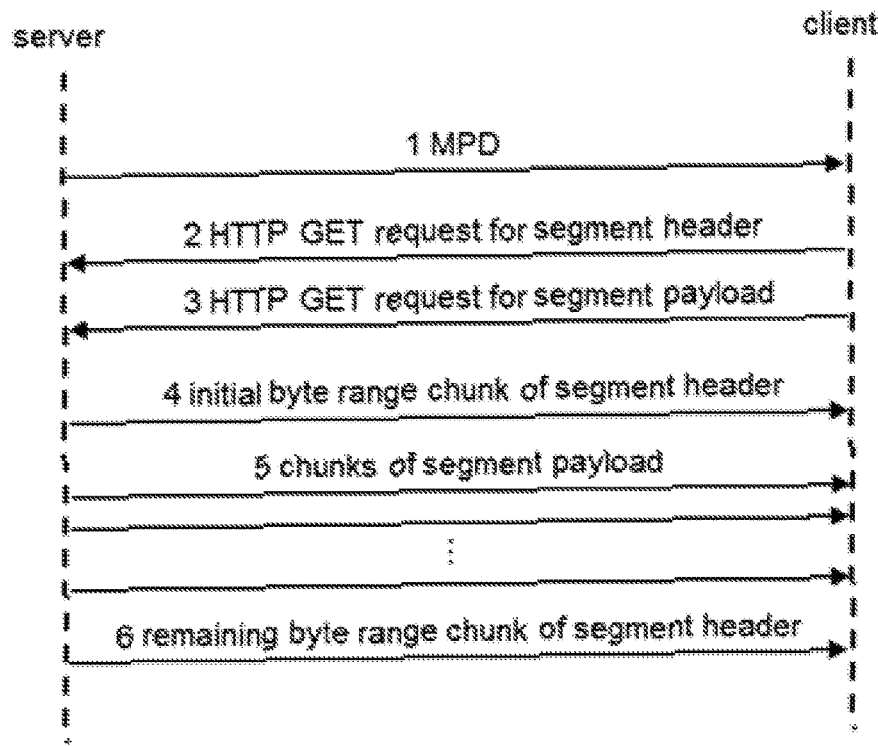
FIG. 7 shows an example of a protocol sequence diagram according to an embodiment of the invention.

The client-server communication may be described with the protocol sequence diagram shown in FIG. 7. The server provides the client with the streaming manifest (1), such as the MPD. The client sends separate HTTP GET requests for the segment headers (2) and the segment payload (3). The server responds to the HTTP GET requests by sending an initial byte range chunk of the segment header (4) and thereafter the corresponding chunks of the segment payload (5). Consequently, the client, such as a low latency player, obtains the initial byte range of the segment header and use track fragment run templates to conclude the metadata for samples (most notably composition times). Hence, the segment header need not be completed before transmitting chunks of segment payload, but the remaining byte range chunk of the segment header can be sent later (6).

A skilled person appreciates that while the diagram of FIG. 6 shows the server as delivering the MPD to the client, the MPD may be delivered to the client from another entity than the server.

The information that the segment payload is tightly packed makes it possible to detect access unit boundaries as follows: The MediaDataBox consists of length-prefixed NAL units, hence NAL units can be reliably identified from the payload of the MediaDataBox. Since NAL units are in correct decoding order, regular access unit boundary detection, as specified in H.264 and H.265, is sufficient for determining sample sizes. Hence, sample sizes need not be received from the segment header to decode and play media data.

Figure 8:
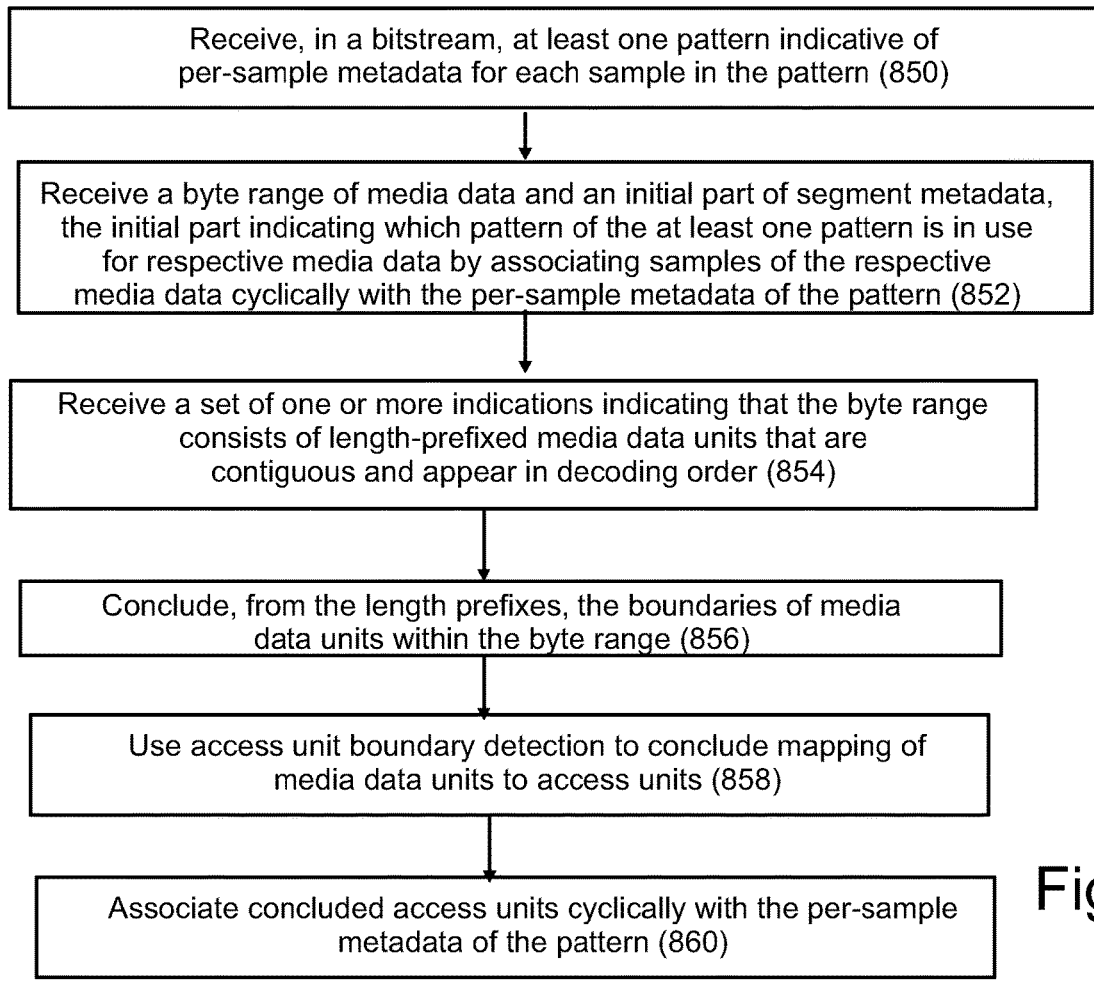
FIG. 8 shows a flow chart of a decoding method according to an embodiment of the invention.

Another aspect of the invention relates to the client operation. The operation may include, as shown in FIG. 8, receiving (850) at least one pattern indicative of per-sample metadata for each sample in the pattern; receiving (852) a byte range of media data and an initial part of segment metadata, the initial part indicating which pattern of the at least one pattern is in use for respective media data by associating samples of the respective media data cyclically with the per-sample metadata of the pattern; receiving (854) a set of one or more indications indicating that the byte range consists of length-prefixed media data units that are contiguous and appear in decoding order; concluding, (856), from the length prefixes, the boundaries of media data units within the byte range; using (858) access unit boundary detection to conclude mapping of media data units to access units; and associating (860) concluded access units cyclically with the per-sample metadata of the pattern.

The embodiments as described herein may facilitate to achieve significant advantages. For example, the byte count overhead of the movie fragment metadata is drastically reduced at least for two reasons: all cyclically repeated metadata is transmitted only once rather than repeating it for each sample, and the cyclically repeated metadata may possibly be shared among several tracks. In other words, the same sample association is used across many tracks, such as all tile or sub-picture tracks representing the same content.

Moreover, the byte count overhead of extractor tracks is drastically reduced at least for two reasons: all cyclically repeated extractor samples are transmitted only once rather than having a separate extractor sample for each sampling instance, and the cyclically repeated patterns of extractor samples may possibly be shared among several tracks, for example in a case where all extractor tracks of the same content represent different viewing orientations of 360° content.

In low-latency live streaming, the need of encoding all media samples of a movie fragment before being able to transmit the movie fragment may advantageously be avoided. The advantages obtained in low-latency live streaming are illustrated schematically in FIGS. 9a and 9b, wherein the protocol sequence diagram of FIG. 7 is extended to including the encoding and encapsulation function and the displaying function. FIG. 9a illustrates the encoding, encapsulation and display function according to the embodiments as described herein, and FIG. 9b illustrates the encoding, encapsulation and display function according to conventional encoding and encapsulation method.

In FIG. 9a, it can be observed that the delivered segment payload chunks can be displayed while the remaining segment payload chunks of the same segment are yet to be encoded, encapsulated, and/or delivered.

Conventionally, as shown in FIG. 9b, the entire segment is encoded and encapsulated before it is transmitted. The displaying of the media data of the segment can only start once the entire segment is received.

Compared to creating very short movie fragments, the embodiments as described herein avoid the byte count overhead.

An example embodiment for a compact TrackRunBox design with syntax and semantics is provided below. This example embodiment falls into the category of allowing to indicate sample metadata for the first sample of a track run directly in the TrackRunBox, and indicating the per-sample metadata pattern applied to the remaining samples of the track run. The skilled person appreciates that the same or similar technical effects may be achieved by implementing some of the features below in a different manner.

According to an embodiment, the one or more of the following flags may be defined:

0x000100 SAMPLE_DURATION_PRESENT: indicates that sample has its own duration, otherwise the default is used.

0x000200 SAMPLE_SIZE_PRESENT: sample has its own size, otherwise the default is used.

0x000400 SAMPLE_FLAGS_PRESENT; sample has its own flags, otherwise the default is used.

0x000800 SAMPLE_CT_OFFSETS_PRESENT; sample has a composition time offset (e.g. as used for I/P/B video in MPEG).

0x000001 DATA_OFFSET_PRESENT; data_offset is present in TrackRunBox

0x001000 FIRST_SAMPLE_PRESENT; indicates that the first sample is not from a track run pattern 0x000004 FIRST_SAMPLE_FLAGS_PRESENT; shall be 0 in version 1 of TrackRunBox when the FIRST_SAMPLE_PRESENT flag is not set. When 0 in version 1 of TrackRunBox, indicates that the first sample uses the default flags. When 1 in version 1 of TrackRunBox, indicates that flags are given for the first sample.

The syntax of TrackRunPatternBox may be specified as follows. It may be allowed to carry a TrackRunPatternBox in a MovieExtendsBox or a MovieFragmentBox.

```
aligned(8) class TrackRunPatternBox
    extends FullBox ('trup', version = 0, flags) {
// length of subsequent syntax elements
unsigned int(2) nbm1_sample_count;
unsigned int(2) nbm1_sample_duration;
unsigned int(2) nbm1_pattern_index;
unsigned int(2) nbm1_ct_offset;
numBitsSampleCount = (nbm1_sample_count + 1) * 8;
numBitsSampleDuration = (nbm1_sample_duration + 1) * 8;
numBitsPatternIdx = (nbm1_pattern_index + 1) * 8;
numBitsCTOffset = (nbm1_ct_offset + 1) * 8;
numPatterns = 0;
// patterns of repeated structures of pictures
for (i = 0;;i++) { // until the end of the box
    unsigned int(8) pattern_len_minus1[i];
    TrackRunPatternStruct(version, i,pattern_len_minus1[i]+1,flags)
       trackRunPattern[i];
    numPatterns++;
}
}
aligned(8) class TrackRunPatternStruct(version, patIdx, numSamples, box-
Flags)
{
    for (i = 0; i < numSamples; i++) {
        if (boxFlags & SAMPLE_DURATION_PRESENT)
            unsigned int(numBitsSampleDuration)
sample_duration[patIdx][i];
        if (boxFlags & SAMPLE_FLAGS_PRESENT)
            unsigned int(32) sample_flags[patIdx][i];
        if (boxFlags & SAMPLE_CT_OFFSETS_PRESENT) {
            if (version == 0)
                signed int(numBitsCTOffset)
                    sample_composition_time_offset[patIdx][i];
            else
                unsigned int(numBitsCTOffset)
                    sample_composition_time_offset[patIdx][i];
        }
    }
    if (boxFlags & SAMPLE_SIZE_PRESENT) {
        for (i = 0; i < numSamples; i++)
            unsigned int(4) num_sample_size_nibbles_minus2[patIdx][i];
            numBitsSampleSize[patIdx][i] =
(num_sample_size_nibbles_minus2[patIdx][i] + 2) * 4;
        if (numSamples % 2)
            bit(4) reserved = 0;
    }
}
```

The syntax of version 2 and 3 of TrackRunBox may be specified as follows. The value of SAMPLE_SIZE_PRESENT in tr_flags may be required to be the same as the value of SAMPLE_SIZE_PRESENT in flags of the TrackRunPatternBox.

```
aligned(8) class TrackRunBox
    extends FullBox('trun', version, tr_flags) {
    if (version == 0 || version == 1) {
        // syntax unchanged
    }
    else if (version >= 2) {
        unsigned int(numBitsSampleCount) sample_count_minus1;
        if (tr_flags & DATA_OFFSET_PRESENT)
            signed int(32) data_offset;
        initSampleFlag = ((tr_flags & FIRST_SAMPLE_PRESENT) > 0);
```
-continued
```
        if (initSampleFlag == 1) {
            if (tr_flags & FIRST_SAMPLE_FLAGS_PRESENT)
                unsigned int(32) sample_flags[0];
            if (tr_flags & SAMPLE_DURATION_PRESENT)
                unsigned int(32) sample_duration[0];
            if (tr_flags & SAMPLE_SIZE_PRESENT)
                unsigned int(32) sample_size[0];
            if (tr_flags & SAMPLE_CT_OFFSETS_PRESENT) {
                if (version == 2)
                    { unsigned int(32)
sample_composition_time_offset[0]; }
                else
                    { signed int(32)
sample_composition_time_offset[0]; }
            }
        }
        if (numPatterns > 1) {
            unsigned int(numBitsPatternIdx) pat_idx;
            patIdx = pat_idx;
        }
        else patIdx = 0;
        if (tr_flags & SAMPLE_SIZE_PRESENT) {
            for (i = initSampleFlag, inPatternIdx = 0, totalBits = 0;
                i <= sample count minus1; i++) {
                unsigned int (numBitsSampleSize[patIdx][inPatternIdx])
                    sample_size[i];
                totalBits += numBitsSampleSize[patIdx][inPatternIdx];
                inPatternIdx = ((inPatternIdx + 1) %
                    (pattern_len_minus1[patIdx] + 1));
            }
            // byte alignment
            numBitsInLastByte = totalBits % 8;
            if (numBitsInLastByte)
                bit(8-numBitsInLastByte) reserved = 0;
        }
    }
}
```

In the syntax above, sample_flags[i], sample_duration[i], sample_size[i], and sample_composition_time_offset[i] provide, respectively, the sample flags, sample duration, sample size, and sample composition time offset for the i-th sample in the track run. When i is in the range of initSampleFlag to sample count minus 1, inclusive, sample_flags[i], sample_duration[i], and sample_composition_time_offset[i] are inferred to be equal to the respective values from the inPatternIdx-th entry of the track pattern run with index pat_idx (for the value of inPatternIdx of the i-th loop entry of the TrackRunBox syntax).

In another example embodiment for compact TrackRun-Box design the syntax and semantics is provided below. This example embodiment falls into the category of allowing to indicate sample metadata for the first sample of a track run in the TrackRunPatternStruct.

```
aligned(8) class TrackRunPatternBox
    extends FullBox ('trup', version = 0, flags = 0) {
// length of subsequent syntax elements
unsigned int(2) nbm1_sample_count;
unsigned int(2) nbm1_sample_duration;
unsigned int(2) nbm1_pattern_index;
unsigned int(2) nbm1_ct_offset;
numBitsSampleCount = (nbm1_sample_count + 1) * 8;
numBitsSampleDuration = (nbm1_sample_duration + 1) * 8;
numBitsPatternIdx = (nbm1_pattern_index + 1) * 8;
numBitsCTOffset = (nbm1_ct_offset + 1) * 8;
numPatterns = 0;
// different types of initial samples
if (flags & 0x000004) {
    unsigned int(8) num_initial_sample_patterns_minus1;
    for (i = 0; i <= num_initial_sample_patterns_minus1; i++) {
        TrackRunPatternStruct(version, i,1,flags)
            trackRunPattern[i];
```

```
    numPatterns++;
  }
}
// patterns of repeated structures of pictures
// until the end of the box
for (i = num_initial_sample_patterns_minus1 + 1;;i++) {
  unsigned int(8) pattern_len_minus1[i];
  TrackRunPatternStruct(version, i, pattern_len_minus1[i]),flags)
    trackRunPattern[i];
  numPatterns++;
  }
}
```

The syntax of TrackRunBox may be specified as follows

```
aligned(8) class TrackRunBox extends FullBox ('trun', version, tr_flags) {
  if (version == 0 || version == 1) {
    // syntax unchanged
  }
  else if (version >= 2) {
    unsigned int(numBitsSampleCount) sample_count_minus1;
    if (tr_flags & DATA_OFFSET_PRESENT)
      signed int(32) data_offset;
    initSampleFlag = ((tr_flags & FIRST_SAMPLE_PRESENT) > 0);
    if (initSampleFlag == 1) {
      if (num_initial_sample_patterns_minus1 >= 1) {
        unsigned int(8) initial_idx;
        initialIdx = initial_idx;
      }
      else
        initialIdx = 0;
      unsigned int(numBitsSampleSize[initial_Idx][0]))
        sample_size[0]; // make optional based on tr_flags
      // byte alignment
      numBitsInLastByte = numBitsSampleSize[initialIdx][0]%8;
      if (numBitsInLastByte)
        bit(8-numBitsInLastByte) reserved = 0;
    }
    if (tr_flags & SAMPLE_SIZE_PRESENT) {
      if (numPatterns > 1) {
        unsigned int(numBitsPatternIdx)    pat_idx;
        patIdx = pat_idx;
      }
      else patIdx = 0;
      for (i = initSampleFlag, inPatternIdx = 0, totalBits = 0;
           i <= sample_count_minus1; i++) {
        unsigned int(numBitsSampleSize[patIdx][inPatternIdx]))
          sample_size[i]; //
        totalBits += numBitsSampleSize[pat Idx][inPatternIdx];
        inPatternIdx = ((inPatternIdx + 1) %
          (pattern_len_minus1[patIdx] + 1));
      }
      // byte alignment
      numBitsInLastByte = totalBits % 8;
      if (numBitsInLastByte)
        bit(8-numBitsInLastByte) reserved = 0;
    }
  }
}
```

While it is typical to include no samples in the MovieBox in HTTP-based streaming but rather to carry all samples in movie fragments, compacting sample size and timing boxes included in the MovieBox may be important for other applications, such as progressive downloading. Embodiments may be applied similarly by providing patterns of sample sizes, durations, and composition time offsets and indicating which pattern is applied e.g. on chunk basis. In the context of ISOBMFF, a chunk may be defined as contiguous set of samples for one track. Chunk(s) may be defined for the samples that are described by a TrackBox.

An identified media data box may have the same semantics as a MediaDataBox has but it additionally contains an identifier that is used in setting up data references to the contained media data. The identifier may for example be the first element contained by the identified media data box. The syntax of an identified media data box may be specified as follows, where imda_identifier is the identifier of the box. It is noted that while imda_identifier of type 64-bit unsigned integer is used in the syntax, other field lengths and other basic data types (e.g. string) are similarly possible.

aligned(8) class IdentifiedMediaDataBox extends Box
        ('imda') {
      unsigned int(64) imda_identifier;
      bit(8) data[ ]; //until the end of the box
    }

A box, here referred to as DataEntryImdaBox, may be used for referencing data in an identified media data box. The DataEntryImdaBox identifies the IdentifiedMediaDataBox containing the media data accessed through the data_reference_index corresponding to this DataEntryImdaBox. The DataEntryImdaBox contains the value of imda_identifier of the referred IdentifiedMediaDataBox. The media data offsets are relative to the first byte of the payload of the referred IdentifiedMediaDataBox. In other words, media data offset 0 points to the first byte of the payload of the referred IdentifiedMediaDataBox. A sample entry contains data_reference_index that identifies which data reference of the DataReferenceBox is in use for containing the samples referencing the sample entry. When an IdentifiedMediaDataBox is used in containing samples, the data_reference_index is set a value pointing to a DataEntryImdaBox. The syntax of DataEntryImdaBox may be specified as follows, where imda ref identifier provides an imda_identifier value and thus identifies a particular IdentifiedMediaDataBox.

aligned(8) class DataEntryImdaBox (bit(24) flags)
        extends FullBox('imdt', version=0, flags) {
      unsigned int(64) imda_ref_identifier;
    }

According to an embodiment, instead of estimating the size of the segment header based on the segment duration, identified media data boxes are used. An identifier value for the identified media data box of the segment is determined and that identifier value is provided as the data reference basis for the media data of the segment.

According to an embodiment, which may be applied independently of or together with other embodiments, a template scheme for the identifier for the identified media data box is defined to be used as a data reference for sample data, e.g. in DataReferenceBox. The template scheme may be based on but is not limited to the movie fragment sequence number (such as the sequence_number field of the MovieFragmentHeaderBox) or track fragment decode time (such as the baseMediaDecodeTime field of TrackFragmentBaseMediaDecodeTimeBox). It needs to be understood that any identifier provided for a movie fragment or a track fragment may be appropriate for the template scheme in addition to or instead of those described above. In an example, the following syntax may be used for referencing an identified media data box using a template for deriving the identifier:

aligned(8) class DataEntryTfdtBasedImdaBox (bit(24)
        flags)
        extends FullBox('imdt', version=0, flags) {
    }

The DataEntryTfdtBasedImdaBox identifies the IdentifiedMediaDataBox containing the media data accessed through the data_reference_index corresponding to this DataEntryTfdtBasedImdaBox. Media data offset 0 points to the first byte of the payload of the IdentifiedMediaDataBox that has imda_identifier equal to baseMediaDecodeTime of the TrackFragmentBaseMediaDecodeTimeBox. 64-bit imda_identifier values are used in order to carry the 64-bit value of baseMediaDecodeTime. If 32-bit baseMediaDecodeTime values are in use, the most-significant bits of the 64-bit imda_identifier may be set to 0. For self-contained movie fragments, the imda_identifier of the IdentifiedMediaDataBox is required to be equal to the baseMediaDecodeTime of TrackFragmentBaseMediaDecodeTimeBox, when the referenced data reference entry is of type DataEntryTfdtBasedImdaBox.

Thus, the size of the MovieFragmentBox need not be known at the time of determining the base data offset(s) of the track(s) of the movie fragment, and consequently the child boxes of the MovieFragmentBox (e.g. TrackFragmentHeaderBox and TrackRunBoxes) can be authored "progressively" before all coded media data for the movie fragment is available. Moreover, the content encapsulator does not need to estimate the size of the segment header correctly and has the flexibility of some dynamic variability of segment durations.

According to an embodiment, patterns for syntax elements of extractors are provided e.g. in a sample entry. As an alternative to a sample entry, patterns for syntax elements of extractors may be provided in a sample group. The syntax elements given in a pattern may be selected by content author.

According to an embodiment, a single pattern is provided, which may be regarded as providing default values of syntax elements of extractors e.g. in a sample entry and thus excluding those syntax elements from the samples referencing to the sample entry. An example embodiment is provided below, where an extractor called HevcExtractorPatternBox is defined. In the example embodiment, exactly one pattern of default extractors is given, i.e. HevcExtractorPatternBox provides default extractors for one sample. It needs to be understood that example embodiments could be similarly realized for more than one patterns of default extractors, whereby the more than one patterns may be cyclically assigned to samples.

Zero or one instances of HevcExtractorPatternBox may be present in a sample entry (in some embodiments) or in a sample group description entry (in some embodiments). When present, the box contains a pattern of compact extractors of each sample referring to this sample entry or sample group description entry and the default values for syntax elements of the compact extractors. It may be concluded that a sample referring to a sample entry or sample group description entry with zero instances of HevcExtractorPatternBox is conventionally formatted (e.g. may contain NAL units or conventional extractors natively).

For example, the following syntax of HevcExtractorPatternBox and related syntax structures may be used:

```
aligned(8) class HevcExtractorPatternBox
    extends FullBox('hexp', 0, 0){
    eidx=0;
    do {//until the end of the box
    DefaultHevcExtractorParametersBox default_extractor
        [eidx];
    //parameters for the eidx-th compact extractor of the
        sample
    eidx++;
    }
}
aligned(8) class DefaultHevcExtractorParametersBox
    extends FullBox('dhep', 0, default_presence_flags){
    cidx=0;
    do {//until the end of the box
    unsigned int(8) default_constructor[cidx];
    if(default constructor[cidx]==0)
    DefaultSampleConstructor(default_presence_flags);
    else if(default_constructor[cidx]==2 &&
        (default_presence_flags & 16))
    DefaultInlineConstructor( );
    cidx++;
    }
    NumConstructors[eidx]=cidx;
}
class aligned(8) DefaultSampleConstructor (default_presence_flags) {
    if (default_presence_flags & 1)
        unsigned int(8) default_track_ref_index;
    if (default_presence_flags & 2)
        signed int(8) default_sample_offset;
    if (default_presence_flags & 4)
        unsigned         int((lengthSizeMinusOne+1)*8)
            default_data_offset;
    if (default_presence_flags & 8)
        unsigned         int((lengthSizeMinusOne+1)*8)
            default_data_length;
}
class aligned(8) DefaultInlineConstructor extends InlineConstructor { }
```

In the syntax above, default_presence_flags controls which syntax element values are given as constant defaults within DefaultHevcExtractorParametersBox and which ones are provided within compact extractors within samples.

default constructor[cidx] provides the cidx-th constructor of a eidx-th compact extractor referring to this sample entry.

When present, default track_ref_index, default_sample_offset, default data_offset, and default data_length have the same semantics as track_ref_index, sample_offset, data_offset, and data_length, respectively, of the SampleConstructor syntax structure.

A compact extractor may be defined as having the same semantics and constraints as an extractor, with the difference that some of the syntax element values used in resolving a compact extractor are provided in DefaultHevcExtractorParametersBox.

For example, the following syntax and related syntax structures may be used for the compact extractor:

```
class aligned(8) CompactExtractor ( ) {
    NALUnitHeader( );
    for(cidx=0; cidx<NumConstructors[eidx]; cidx++) {
        if(default constructor[cidx]==0)
            ConditionalSampleConstructor( );
        else if(default constructor[cidx]==2 &&
            (default_presence_flags & 16)==0)
            InlineConstructor( );
    }
    eidx++;
}
class aligned(8) ConditionalSampleConstructor {
    if ((default_presence_flags & 1)==0)
        unsigned int(8) track_ref_index;
    if ((default_presence_flags & 2)==0)
        signed int(8) sample_offset;
    if ((default_presence_flags & 4)==0)
        unsigned int((lengthSizeMinusOne+1)*8) data_offset;
    if ((default_presence_flags & 8)==0)
        unsigned int((lengthSizeMinusOne+1)*8) data_length;
}
```

A compact extractor has the same semantics and constraints as an extractor, with the difference that some of the syntax element values used in resolving a compact extractor are provided in HevcExtractorPatternBox. For parsing a sample containing compact extractor(s), the value of eidx is set equal to 0 at the start of a sample. For parsing eidx-th CompactExtractor of a sample, default_presence_flags are set to the default_presence_flags of the eidx-th DefaultHevcExtractorParametersBox of HevcExtractorPatternBox.

Resolving an extractor sample requires all the referenced data to be available. When the number of tracks from which data is extracted is relatively large, delayed transmission of at least one of the tracks may cause the inability to resolve extractor samples, which may consequently cause an interruption in the playback. In some cases extractor tracks or client's selection between alternative tracks for extraction may be such that it could be preferable to omit the data of the track that is delayed and continue uninterrupted playback. For example, the delayed track may represent content that is outside of the viewport or the content of the delayed track may be represented by other extracted track(s), such as a low-resolution version of the content that is completely represented by the extractor track.

According to an embodiment, backup in-line data for replacing an extractor in the case that the extractor cannot be resolved is provided. Advantageously, the in-line data is provided in a manner that it needs not be repeated in samples but is provided in a manner that it can be referenced by multiple samples, e.g. in a sample entry or in a sample group description entry. The in-line data may for example comprise one or more VCL NAL units only comprising skip-coded coding tree units. Skip coding may refer to inferring or indicating a prediction mode, such as the merge mode in inter-predicted slices, and omitting the prediction error coding. Syntax elements for prediction error are not present for skip-coded blocks.

This embodiment provides at least the advantage that the client does not need to be capable of concluding valid VCL NAL unit data itself, which could involve e.g. a partial encoder implementation involving e.g. a CABAC encoder. Moreover, the content author can indicate whether it is an acceptable client strategy to omit the decoding of the data referenced by the extractor.

The backup in-line data for an extractor of a particular index within the sample should be used for resolving samples until the referenced track(s) by the actual extractor of that particular index contains a sync sample or a stream access point (SAP).

According to an embodiment, the HevcExtractorPatternBox is appended as follows.
  aligned(8) class HevcExtractorPatternBox
    extends FullBox('hexp', 0, 0){
    eidx=0;
    do {//until the end of the box
    DefaultHevcExtractorParametersBox
    default_extractor[eidx];
    //parameters for the eidx-th compact extractor of the
      sample
    BackupInlineConstructorBox
    backup_inline_constructor[eidx];
    //optional
    eidx++;
    }
  }
  aligned (8) class BackupInlineConstructorBox
    extends FullBox('bilc', 0, 0) {
    unsigned int(8) backup_inline_data[ ]; //until the end of
      the box
  }

When present, the BackupInlineConstructorBox for a particular value of eidx provides the in-line data as an alternative to resolve the eidx-th compact extractor e.g. in the case that the referenced data for the compact extractor is not available. backup_inline_data provides the data bytes to be returned when resolving the extractor with the backup in-line data.

In an embodiment, which may be applied with or without the backup in-line constructor embodiment above, more than one alternative extractors are provided out of which one is selected at the time of resolving the extractor sample referencing the extractor pattern. The alternative is selected on the basis of a pre-defined or indicated condition. The condition may be but is not limited to one of the following:

Track identifier (track ID): when 'scal' track reference refers to a track group, one of the tracks in the track group is selected as the source for extraction. The alternative extractor may be selected based on which track among the track group is selected as the source for extraction.

A track reference index: several tracks can be included as potential sources for extraction in a track reference box of a particular type (e.g. 'scal' or 'psex', where the latter may stand for potential source for extraction). Alternative extractors may be defined and selected on the basis of which reference is selected among the indicated potential sources. Track reference indices to the track reference box of the particular type may be used in indicating the alternative extractors.

Sync and/or SAP sample type: The alternative extractor may be selected based on whether a referenced sample is a sync sample or a SAP sample of a particular type. For example, a first extractor may be selected if the referenced sample is a sync sample or a SAP sample of type 1 or 2, and a second extractor may be selected otherwise.

An example embodiment using a track reference index for alternative extractors and 'psex' track references to potential sources for extraction is provided next in relation to earlier embodiments. Several alternatives may be provided for each extractor specified in the extractor pattern. One of the box flags (here default_presence_flags & 32, where default_presence_flags are the box flags for DefaultHevcExtractorParametersBox) may be used to indicate which set of extractor parameters is the last alternative for a particular eidx value (i.e. for a particular index of extractors within the extractor pattern). If the set of extractor parameters is not the last one for a particular eidx value, the track reference indices indicating which index(es) of the 'psex' track reference box the given extractor parameters apply are provided (here ref_index[i] of DefaultHevcExtractorParametersBox). The following syntax may be used:
  aligned(8) class HevcExtractorPatternBox
    extends FullBox('hexp', 0, 0) {
    eidx=0;
    do {//until the end of the box
    for(alt=0;; alt++)//until (default_presence_flags & 32)
      is 1
    DefaultHevcExtractorParametersBox default_extractor
      [eidx][alt];
    //parameters for the eidx-th compact extractor of the
      sample
    //and for alternative alt
    eidx++;

```
}
}
aligned(8) class DefaultHevcExtractorParametersBox
    extends FullBox('dhep', 0, default_presence_flags){
    cidx=0;
    if ((default_presence_flags & 32)==0) {
    unsigned int(8) num_ref_indices_minus1;
    for (i=0; i<=num_ref_indices_minus1; i++)
    unsigned int(32) ref_index[i]
    }
    do {//until the end of the box
    unsigned int(8) default_constructor[cidx];
    if(default constructor[cidx]==0)
    DefaultSampleConstructor(default_presence_flags);
    else if(default_constructor[cidx]==2 &&
    (default_presence_flags & 16))
    DefaultInlineConstructor( );
    cidx++;
    }
    NumConstructors[eidx]=cidx;
}
```

A recent trend in 360° video streaming for reducing streaming bitrate may be called viewport-dependent streaming or viewport-adaptive streaming, and may be briefly described as follows: a subset of 360-degree video content covering the primary viewport (i.e., the current view orientation) is transmitted at the best quality/resolution, while the remaining of 360-degree video is transmitted at a lower quality/resolution. Viewport-adaptive streaming may be realized through a tile-based encoding and streaming approaches. In one approach of tile-based encoding and streaming, encoding is performed in a manner that the resulting bitstream comprises motion-constrained tile sets. Several bitstreams of the same source content are encoded using motion-constrained tile sets. One or more motion-constrained tile set (MCTS) sequences are extracted from a bitstream, and each extracted motion-constrained tile set sequence is stored as a track (e.g. an HEVC tile track or a sub-picture track) in a file. The client selectively receives tracks in a manner that better quality or higher resolution MCTS tracks may be received for the current viewport compared to the quality or resolution covering the remaining, currently non-visible viewports. The client merges the content of the received tracks, i.e. merges the received MCTSs, into a bitstream to be decoded. Since the viewing orientation may change over time, the selected tracks and MCTSs may also change over time and additionally the position of the respective MCTSs within the merged pictures may change from one merged picture to another. An extractor track may be provided by content authoring and/or may be processed by a player for the selection and/or merging of MCTSs for viewport-dependent streaming and/or playback.

Among other things, the above-described embodiment enables the use of a first extractor when the referenced sample is a RAP sample and a second extractor when the referenced sample is a non-RAP sample. A viewport change in omnidirectional video streaming may cause a need to request a set of high-quality or high-resolution MCTS sequences that were not previously received, while it may be appropriate to continue receiving a subset of the high-quality or high-resolution MCTS sequences that were also previously received. The reception of MCTS sequences that were previously not received can be started from a RAP picture in the sub-picture or tile tracks carrying those MCTS sequences, while other received MCTS sequences would advantageously continue to use inter prediction. Several versions of collocated sub-picture or tile tracks may be authored for different RAP picture periods and/or different RAP picture positions in time. Advantageously, the collocated sub-picture or tile tracks would be indicated as alternatives out of which the player can select. If a viewport change requires a particular sub-picture or tile position that was previously not received at the same resolution or quality, the player may choose the version from the alternatives that has a RAP picture at an appropriate position (e.g. at the start of a next Segment). Since the slice header of RAP pictures (or I slices) may differ from the slice header of non-RAP pictures (or P/B slices), a single extractor may not suffice for extracting either I slices or P/B slices depending on player's choice of the source for extraction. The above-described embodiment hence suits viewport-dependent streaming and enables viewport change in a manner where only a subset of the MCTSs are intra-predicted while the other MCTSs continue to be inter-predicted, hence avoiding a bitrate spike and saving in streaming bitrate.

In an embodiment, a first and a second sub-picture or tile tracks are indicated to be alternatives for extraction, a first extractor pattern is created for samples where both the first and the second track have the same picture type (e.g. BLA without leading pictures), and a second extractor pattern is created for samples where the first track has a first picture type (e.g. BLA without leading pictures) and the second track has a second picture type (e.g. TRAIL). The selection of which extractor pattern is in use for particular extractor samples may be indicated e.g. through sample groups.

As RAP pictures for HEVC, BLA or CRA pictures without leading pictures or with decodable leading (RADL) pictures may be used. Reference picture sets indicated in BLA and CRA pictures are selected to be the same as the reference pictures in time-aligned non-RAP pictures in other bitstreams. Since the picture type (nal_unit_type) may be required to be the same for all VCL NAL units of a picture (e.g. in HEVC), an extractor pattern that uses RAP and non-RAP pictures as alternative sources for extraction may change the nal_unit_type to indicate a non-RAP picture, such as a TRAIL picture of HEVC.

While the embodiments related to backup in-line constructor and alternative extractors were described above in relation to extractor patterns, it needs to be understood that they could be similarly realized in relation to extractor samples, where extractor samples may be conventional (include extractors natively rather than referencing extractor patterns) or compact (e.g. formatted similarly to Compact-Extractor above) through referencing an extractor pattern. For example, several alternatives of an in-line constructor could be provided in a extractor sample and selected on the basis of track reference index used as source for extraction.

Figure 10:
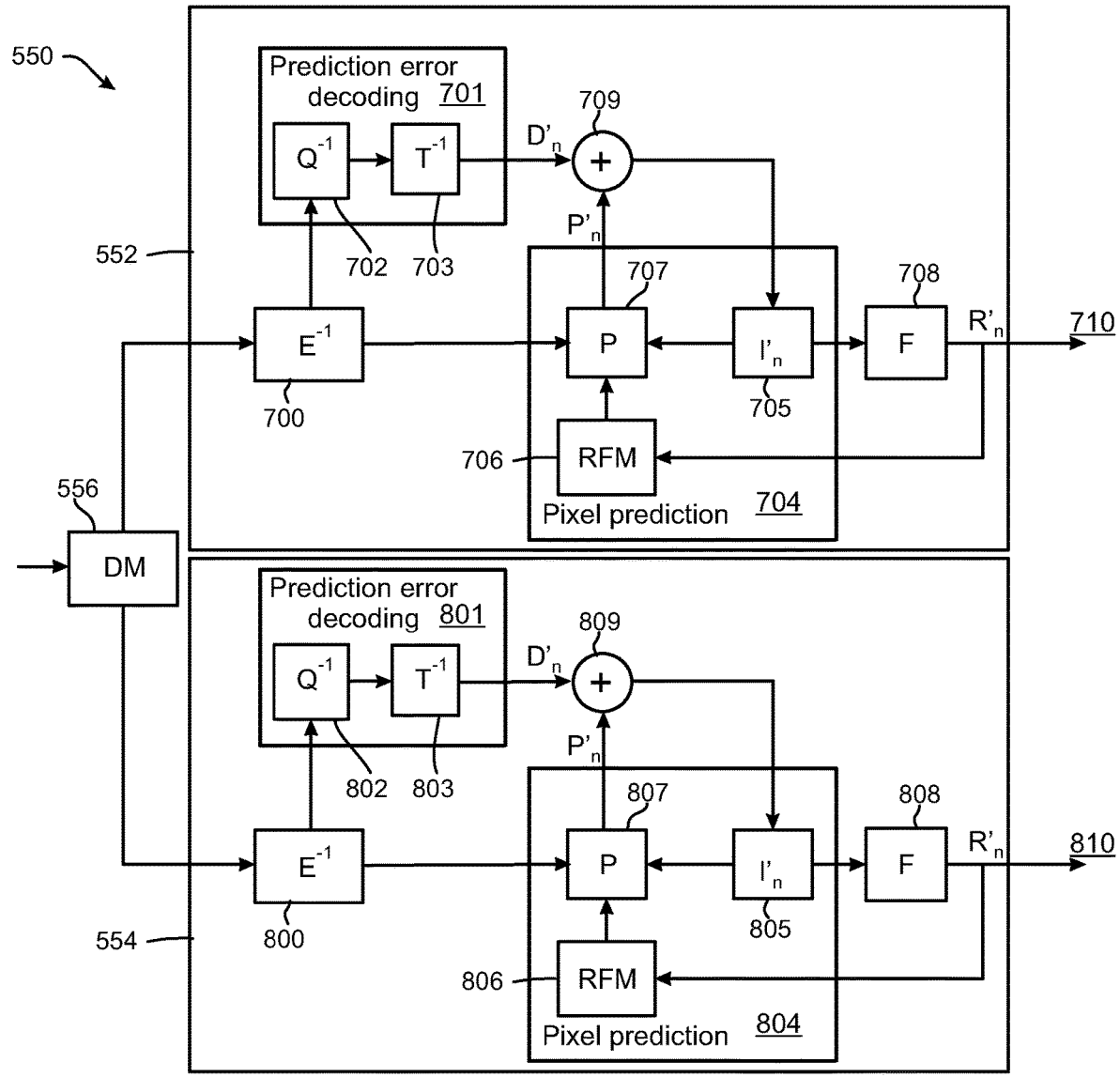
FIG. 10 shows a schematic diagram of a decoder suitable for implementing embodiments of the invention.

FIG. 10 shows a block diagram of a video decoder suitable for employing embodiments of the invention. FIG. 10 depicts a structure of a two-layer decoder, but it would be appreciated that the decoding operations may similarly be employed in a single-layer decoder.

The video decoder 550 comprises a first decoder section 552 for a base layer and a second decoder section 554 a predicted layer. Block 556 illustrates a demultiplexer for delivering information regarding base layer pictures to the first decoder section 552 and for delivering information regarding predicted layer pictures to the second decoder section 554. Reference P'n stands for a predicted representation of an image block. Reference D'n stands for a reconstructed prediction error signal. Blocks 704, 804 illustrate preliminary reconstructed images (I'n). Reference R'n stands for a final reconstructed image. Blocks 703, 803 illustrate inverse transform ($T^{-1}$). Blocks 702, 802 illustrate inverse quantization ($Q^{-1}$). Blocks 701, 801 illustrate entropy decoding ($E^{-1}$). Blocks 705, 805 illustrate a reference frame memory (RFM). Blocks 706, 806 illustrate prediction (P) (either inter prediction or intra prediction). Blocks 707, 807 illustrate filtering (F). Blocks 708, 808 may be used to combine decoded prediction error information with predicted base layer/predicted layer images to obtain the preliminary reconstructed images (I'n). Preliminary reconstructed and filtered base layer images may be output 709 from the first decoder section 552 and preliminary reconstructed and filtered base layer images may be output 809 from the first decoder section 554.

Herein, the decoder should be interpreted to cover any operational unit capable to carry out the decoding operations, such as a player, a receiver, a gateway, a demultiplexer and/or a decoder.

Figure 11:
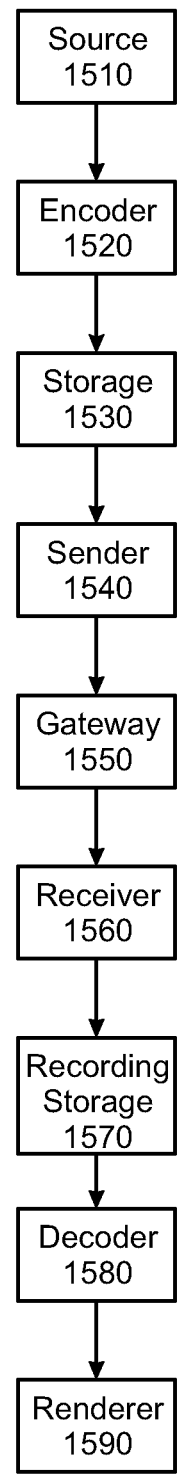
FIG. 11 shows a schematic diagram of an example multimedia communication system within which various embodiments may be implemented.

FIG. 11 is a graphical representation of an example multimedia communication system within which various embodiments may be implemented. A data source 1510 provides a source signal in an analog, uncompressed digital, or compressed digital format, or any combination of these formats. An encoder 1520 may include or be connected with a pre-processing, such as data format conversion and/or filtering of the source signal. The encoder 1520 encodes the source signal into a coded media bitstream. It should be noted that a bitstream to be decoded may be received directly or indirectly from a remote device located within virtually any type of network. Additionally, the bitstream may be received from local hardware or software. The encoder 1520 may be capable of encoding more than one media type, such as audio and video, or more than one encoder 1520 may be required to code different media types of the source signal. The encoder 1520 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in the figure only one encoder 1520 is represented to simplify the description without a lack of generality. It should be further understood that, although text and examples contained herein may specifically describe an encoding process, one skilled in the art would understand that the same concepts and principles also apply to the corresponding decoding process and vice versa.

The coded media bitstream may be transferred to a storage 1530. The storage 1530 may comprise any type of mass memory to store the coded media bitstream. The format of the coded media bitstream in the storage 1530 may be an elementary self-contained bitstream format, or one or more coded media bitstreams may be encapsulated into a container file, or the coded media bitstream may be encapsulated into a Segment format suitable for DASH (or a similar streaming system) and stored as a sequence of Segments. If one or more media bitstreams are encapsulated in a container file, a file generator (not shown in the figure) may be used to store the one more media bitstreams in the file and create file format metadata, which may also be stored in the file. The encoder 1520 or the storage 1530 may comprise the file generator, or the file generator is operationally attached to either the encoder 1520 or the storage 1530. Some systems operate "live", i.e. omit storage and transfer coded media bitstream from the encoder 1520 directly to the sender 1540. The coded media bitstream may then be transferred to the sender 1540, also referred to as the server, on a need basis. The format used in the transmission may be an elementary self-contained bitstream format, a packet stream format, a Segment format suitable for DASH (or a similar streaming system), or one or more coded media bitstreams may be encapsulated into a container file. The encoder 1520, the storage 1530, and the server 1540 may reside in the same physical device or they may be included in separate devices. The encoder 1520 and server 1540 may operate with live real-time content, in which case the coded media bitstream is typically not stored permanently, but rather buffered for small periods of time in the content encoder 1520 and/or in the server 1540 to smooth out variations in processing delay, transfer delay, and coded media bitrate.

The server 1540 sends the coded media bitstream using a communication protocol stack. The stack may include but is not limited to one or more of Real-Time Transport Protocol (RTP), User Datagram Protocol (UDP), Hypertext Transfer Protocol (HTTP), Transmission Control Protocol (TCP), and Internet Protocol (IP). When the communication protocol stack is packet-oriented, the server 1540 encapsulates the coded media bitstream into packets. For example, when RTP is used, the server 1540 encapsulates the coded media bitstream into RTP packets according to an RTP payload format. Typically, each media type has a dedicated RTP payload format. It should be again noted that a system may contain more than one server 1540, but for the sake of simplicity, the following description only considers one server 1540.

If the media content is encapsulated in a container file for the storage 1530 or for inputting the data to the sender 1540, the sender 1540 may comprise or be operationally attached to a "sending file parser" (not shown in the figure). In particular, if the container file is not transmitted as such but at least one of the contained coded media bitstream is encapsulated for transport over a communication protocol, a sending file parser locates appropriate parts of the coded media bitstream to be conveyed over the communication protocol. The sending file parser may also help in creating the correct format for the communication protocol, such as packet headers and payloads. The multimedia container file may contain encapsulation instructions, such as hint tracks in the ISOBMFF, for encapsulation of the at least one of the contained coded media bitstream on the communication protocol.

The server 1540 may or may not be connected to a gateway 1550 through a communication network, which may e.g. be a combination of a CDN, the Internet and/or one or more access networks. The gateway may also or alternatively be referred to as a middle-box. For DASH, the gateway may be an edge server (of a CDN) or a web proxy. It is noted that the system may generally comprise any number gateways or alike, but for the sake of simplicity, the following description only considers one gateway 1550. The gateway 1550 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. The gateway 1550 may be a server entity in various embodiments.

The system includes one or more receivers 1560, typically capable of receiving, de-modulating, and de-capsulating the transmitted signal into a coded media bitstream. The coded media bitstream may be transferred to a recording storage

1570. The recording storage 1570 may comprise any type of mass memory to store the coded media bitstream. The recording storage 1570 may alternatively or additively comprise computation memory, such as random access memory. The format of the coded media bitstream in the recording storage 1570 may be an elementary self-contained bitstream format, or one or more coded media bitstreams may be encapsulated into a container file. If there are multiple coded media bitstreams, such as an audio stream and a video stream, associated with each other, a container file is typically used and the receiver 1560 comprises or is attached to a container file generator producing a container file from input streams. Some systems operate "live," i.e. omit the recording storage 1570 and transfer coded media bitstream from the receiver 1560 directly to the decoder 1580. In some systems, only the most recent part of the recorded stream, e.g., the most recent 10-minute excerption of the recorded stream, is maintained in the recording storage 1570, while any earlier recorded data is discarded from the recording storage 1570.

The coded media bitstream may be transferred from the recording storage 1570 to the decoder 1580. If there are many coded media bitstreams, such as an audio stream and a video stream, associated with each other and encapsulated into a container file or a single media bitstream is encapsulated in a container file e.g. for easier access, a file parser (not shown in the figure) is used to decapsulate each coded media bitstream from the container file. The recording storage 1570 or a decoder 1580 may comprise the file parser, or the file parser is attached to either recording storage 1570 or the decoder 1580. It should also be noted that the system may include many decoders, but here only one decoder 1570 is discussed to simplify the description without a lack of generality The coded media bitstream may be processed further by a decoder 1570, whose output is one or more uncompressed media streams. Finally, a renderer 1590 may reproduce the uncompressed media streams with a loudspeaker or a display, for example. The receiver 1560, recording storage 1570, decoder 1570, and renderer 1590 may reside in the same physical device or they may be included in separate devices.

A sender 1540 and/or a gateway 1550 may be configured to perform switching between different representations e.g. for switching between different viewports of 360-degree video content, view switching, bitrate adaptation and/or fast start-up, and/or a sender 1540 and/or a gateway 1550 may be configured to select the transmitted representation(s). Switching between different representations may take place for multiple reasons, such as to respond to requests of the receiver 1560 or prevailing conditions, such as throughput, of the network over which the bitstream is conveyed. In other words, the receiver 1560 may initiate switching between representations. A request from the receiver can be, e.g., a request for a Segment or a Subsegment from a different representation than earlier, a request for a change of transmitted scalability layers and/or sub-layers, or a change of a rendering device having different capabilities compared to the previous one. A request for a Segment may be an HTTP GET request. A request for a Subsegment may be an HTTP GET request with a byte range. Additionally or alternatively, bitrate adjustment or bitrate adaptation may be used for example for providing so-called fast start-up in streaming services, where the bitrate of the transmitted stream is lower than the channel bitrate after starting or random-accessing the streaming in order to start playback immediately and to achieve a buffer occupancy level that tolerates occasional packet delays and/or retransmissions. Bitrate adaptation may include multiple representation or layer up-switching and representation or layer down-switching operations taking place in various orders.

A decoder 1580 may be configured to perform switching between different representations e.g. for switching between different viewports of 360-degree video content, view switching, bitrate adaptation and/or fast start-up, and/or a decoder 1580 may be configured to select the transmitted representation(s). Switching between different representations may take place for multiple reasons, such as to achieve faster decoding operation or to adapt the transmitted bitstream, e.g. in terms of bitrate, to prevailing conditions, such as throughput, of the network over which the bitstream is conveyed. Faster decoding operation might be needed for example if the device including the decoder 1580 is multitasking and uses computing resources for other purposes than decoding the video bitstream. In another example, faster decoding operation might be needed when content is played back at a faster pace than the normal playback speed, e.g. twice or three times faster than conventional real-time playback rate.

In the above, some embodiments have been described with reference to and/or using terminology of HEVC. It needs to be understood that embodiments may be similarly realized with any video encoder and/or video decoder with respective terms of other codecs. For example, rather than tiles or tile sets, embodiments could be realized with rectangular slice groups of H.264/AVC.

In the above, some embodiments have been described with reference to segments, e.g. as defined in MPEG-DASH. It needs to be understood that embodiments may be similarly realized with subsegments, e.g. as defined in MPEG-DASH.

In the above, some embodiments have been described in relation to ISOBMFF, e.g. when it comes to segment format and/or movie fragment format. It needs to be understood that embodiments could be similarly realized with any other file format, such as Matroska, with similar concepts and/or capability and/or structures as those in ISOBMFF.

In the above, some embodiments have been described with reference to the term extractor track. It needs to be understood that embodiments can be realized with any type of collector tracks, rather than just extractor tracks. More specifically, the embodiments can be realized with tile base tracks instead of extractor tracks. Moreover, embodiments can be realized by using both extractor tracks and tile base tracks, e.g. in the same file or for different Representations included in the same MPD.

In the above, where the example embodiments have been described with reference to file writing or authoring, it needs to be understood that the resulting file and the file parser or reader may have corresponding elements in them. Likewise, where the example embodiments have been described with reference to a file parsing or reading, it needs to be understood that the file writer or author may have structure and/or computer program for generating the file to be parsed by the file parser or reader.

In the above, where the example embodiments have been described with reference to an encoder, it needs to be understood that the resulting bitstream and the decoder may have corresponding elements in them. Likewise, where the example embodiments have been described with reference to a decoder, it needs to be understood that the encoder may have structure and/or computer program for generating the bitstream to be decoded by the decoder.

The embodiments of the invention described above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore, it is possible that the coder and decoder may share some or all common elements.

Although the above examples describe embodiments of the invention operating within a codec within an electronic device, it would be appreciated that the invention as defined in the claims may be implemented as part of any video codec. Thus, for example, embodiments of the invention may be implemented in a video codec which may implement video coding over fixed or wired communication paths.

Thus, user equipment may comprise a video codec such as those described in embodiments of the invention above. It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. A method comprising:
performing, as part of a file encapsulation process of a coded video bitstream, operations comprising:
writing, in a container file, an identified media data element corresponding to the coded video bitstream;
including into the identified media data element a first identifier to be used as a reference by other elements for identified media data contained by the identified media data element, wherein said first identifier is a first movie fragment sequence number;
including into the container file a data reference element that, when referenced, causes a second identifier to be derived from the first movie fragment sequence number, and the second identifier indicates the identified media data element;
referencing the identified media data element in the data reference element;
including into the container file a first sample entry that references the data reference element;
including into the container file a movie fragment that comprises a track fragment and comprises the first movie fragment sequence number or a first track fragment decode time;
including into the track fragment a sample_description_ index that identifies the first sample entry to be in use for the track fragment and is indicative that the identified media data element comprises media data for the track fragment; and
storing at least the container file to mass memory for subsequent transmission.

2. The method according to claim 1, wherein the container file is structured according to ISO base media file format (ISOBMFF), the method further comprising:
writing in the container file the identified media data element as an IdentifiedMediaDataBox; and
including in the IdentifiedMediaDataBox an imda_identifier which defines the first identifier.

3. The method according to claim 1 further comprising:
writing in the container file the first identifier as a first element of the identified media data element.

4. An apparatus comprising:
at least one processor; and
at least one memory storing instructions that, when executed by the at least one processor, cause the apparatus at least to perform:
performing, as part of a file encapsulation process of a coded video bitstream, operations comprising:
write in a container file, an identified media data element corresponding to the coded video bitstream;
include into the identified media data element a first identifier to be used as a reference by other elements for identified media data contained by the identified media data element, wherein said first identifier is a first movie fragment sequence number; and
include into the container file a data reference element that, when referenced, causes a second identifier to be derived from the first movie fragment sequence number, and the second identifier indicates the identified media data element;
reference the identified media data element in the data reference element;
include into the container file a first sample entry that references the data reference element;
include into the container file a movie fragment that comprises a track fragment and comprises the first movie fragment sequence number or a first track fragment decode time;
include into the track fragment a sample_description_index that identifies the first sample entry to be in use for the track fragment and is indicative that the identified media data element comprises media data for the track fragment; and
store at least the container file to mass memory for subsequent transmission.

5. The apparatus according to claim 4, wherein the container file is structured according to ISO base media file format (ISOBMFF), and wherein the at least one memory further stores instructions that, when executed by the at least one processor, cause the apparatus at least to perform:
write in the container file the identified media data element as an IdentifiedMediaDataBox; and
include in the IdentifiedMediaDataBox an imda_identifier which defines the first identifier.

6. The apparatus according to claim 4, wherein the at least one memory further stores instructions that, when executed by the at least one processor, cause the apparatus at least to perform: write in the container file the first identifier as a first element of the identified media data element.

7. A method comprising:
performing, as part of a file decapsulation process for a coded video bitstream, operations comprising:
parsing, from a container file corresponding to the coded video bitstream and comprising an identified media data element corresponding to the coded video bitstream, a first identifier, wherein said first identifier is to be used as a reference by other elements for identified media data contained by the identified media data element, and the first identifier is a first movie fragment sequence number;
parsing, from the container file, a data reference element and a reference to the data reference element whereupon parsing the reference to the data reference element causes a second identifier to be derived from the first movie fragment sequence number, and the second identifier indicates the identified media data element;
using said first identifier as a reference for the identified media data in the identified media data element and said second identifier as an indicator of the identified media data element;
parsing the identified media data element by the data reference element;
parsing, from the container file, a first sample entry that references the data reference element;
parsing, from the container file, a movie fragment that comprises a track fragment and comprises the first movie fragment sequence number or a first track fragment decode time;
parsing, from the track fragment, a sample_description_index that identifies the first sample entry to be in use for the track fragment and is indicative that the identified media data element comprises media data for the track fragment; and
decoding a video bitstream decapsulated from the container file.

8. The method according to claim 7, wherein the container file is structured according to ISO base media file format (ISOBMFF), and wherein the method further comprises:
parsing the first identifier from the container file as an imda_identifier; and
using the first identifier as a reference to the identified media data in an IdentifiedMediaDataBox.

9. The method according to claim 7 further comprising: parsing, from the container file, the first identifier as a first element of the identified media data element.

10. The method according to claim 7 further comprising:
parsing, from the container file, a first sample entry that references the data reference element.

11. An apparatus comprising:
at least one processor; and
at least one memory storing instructions that, when executed by the at least one processor, cause the apparatus at least to perform:
perform, as part of a file decapsulation process for a coded video bitstream:
parse, from a container file corresponding to the coded video bitstream and comprising an identified media data element corresponding to the coded video bitstream, a first identifier, wherein said first identifier is to be used as a reference by other elements for identified media data contained by the identified media data element, and the first identifier is a first movie fragment sequence number;
parse, from the container file, a data reference element and a reference to the data reference element whereupon parsing the reference to the data reference element causes a second identifier to be derived from the first movie fragment sequence number, and the second identifier indicates the identified media data element;
use said first identifier as a reference to the identified media data in the identified media data element and said second identifier as an indicator of the identified media data element;
parse the identified media data element by the data reference element;
parse, from the container file, a first sample entry that references the data reference element;
parse, from the container file, a movie fragment that comprises a track fragment and comprises the first movie fragment sequence number or a first track fragment decode time;

parse, from the track fragment, a sample_description_index that identifies the first sample entry to be in use for the track fragment and is indicative that the identified media data element comprises media data for the track fragment; and
decoding a video bitstream decapsulated from the container file.

12. The apparatus according to claim 11, wherein the container file is structured according to ISO base media file format (ISOBMFF), and wherein the at least one memory further stores instructions that, when executed by the at least one processor, cause the apparatus at least to perform:
parse the first identifier from the container file as an imda_identifier; and
use the first identifier as a reference to the identified media data in an IdentifiedMediaDataBox.

13. The apparatus according to claim 11, wherein the at least one memory further stores instructions that, when executed by the at least one processor, cause the apparatus at least to perform: parse, from the container file, the first identifier as a first element of the identified media data element.

14. The apparatus according to claim 5, wherein the second identifier is an imda_ref_identifier.

* * * * *